US012561168B2

(12) United States Patent
Chen et al.

(10) Patent No.: US 12,561,168 B2
(45) Date of Patent: *Feb. 24, 2026

(54) SCHEDULING OF A PLURALITY OF GRAPHIC PROCESSING UNITS

(71) Applicant: Microsoft Technology Licensing, LLC, Redmond, WA (US)

(72) Inventors: Qingcha Chen, Redmond, WA (US); Wenjin Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 27 days.

This patent is subject to a terminal disclaimer.

(21) Appl. No.: 18/628,102

(22) Filed: Apr. 5, 2024

(65) Prior Publication Data

US 2024/0248759 A1     Jul. 25, 2024

Related U.S. Application Data

(63) Continuation of application No. 17/044,284, filed as application No. PCT/US2019/030787 on May 6, 2019, now Pat. No. 11,983,564.

(30) Foreign Application Priority Data

May 18, 2018    (CN) .......................... 201810478340.3

(51) Int. Cl.
*G06F 9/50*          (2006.01)
*G06T 1/20*          (2006.01)
(52) U.S. Cl.
CPC .......... *G06F 9/5022* (2013.01); *G06F 9/5061* (2013.01); *G06T 1/20* (2013.01); *G06F 2209/5011* (2013.01)

(58) Field of Classification Search
CPC combination set(s) only.
See application file for complete search history.

(56) References Cited

U.S. PATENT DOCUMENTS

| | | | |
|---|---|---|---|
| 11,983,564 B2 * | 5/2024 | Chen ..................... | G06F 9/5022 |
| 2011/0050713 A1 * | 3/2011 | McCrary .............. | G06F 9/3851 |
| | | | 345/530 |

(Continued)

OTHER PUBLICATIONS

Communication pursuant to Article 71(3) EPC, Received for European Application No. 19724699.4, mailed on Feb. 18, 2025, 7 pages.

*Primary Examiner* — Kenneth Tang
(74) *Attorney, Agent, or Firm* — Schwegman Lundberg & Woessner, P.A.

(57) ABSTRACT

The present disclosure provides a method and apparatus for scheduling a plurality of available graphics processing units (GPUs). Multiple GPU pools may be set, wherein each GPU pool is configured to serve one or more jobs requiring the same number of GPUs. Available GPUs may be assigned to each GPU pool. A job and job information related to the job may be received, wherein the job information indicates a number of GPUs required for performing the job. A corresponding GPU pool may be selected from the multiple GPU pools based at least on the job information. Available GPUs to be scheduled to the job in the selected GPU pool may be determined based at least on the job information. In addition, the determined available GPUs may be scheduled to the job.

20 Claims, 15 Drawing Sheets

(56)  References Cited

U.S. PATENT DOCUMENTS

| 2014/0259016 A1* | 9/2014 | Lottes | G06F 9/4881 |
| | | | 718/102 |
| 2015/0371354 A1* | 12/2015 | Petersen | G06F 9/5083 |
| | | | 345/522 |
| 2017/0293994 A1* | 10/2017 | Li | G06T 1/20 |
| 2018/0373540 A1* | 12/2018 | Bao | G06F 9/5038 |
| 2019/0155660 A1* | 5/2019 | McQuighan | G06F 9/5022 |
| 2019/0197655 A1* | 6/2019 | Sun | G06F 9/5077 |
| 2019/0312772 A1* | 10/2019 | Zhao | H04L 41/12 |
| 2023/0376762 A1* | 11/2023 | Sridharan | G06N 3/045 |

* cited by examiner

Sequential
Assignment

Random
Assignment

Resource Release
Under Sequential
Assignment

Resource Release
Under Random
Assignment

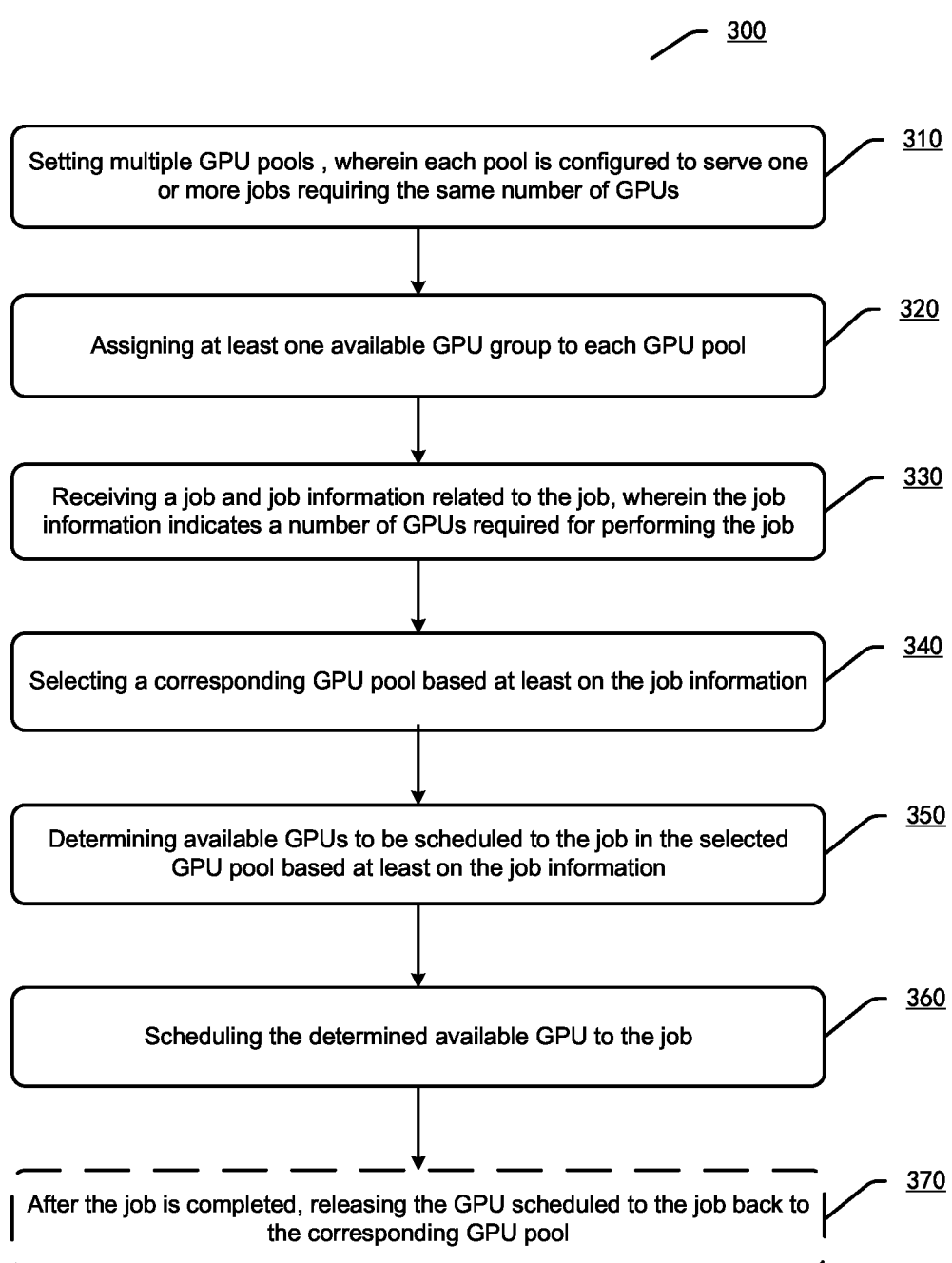

300

Setting multiple GPU pools , wherein each pool is configured to serve one or more jobs requiring the same number of GPUs    310

Assigning at least one available GPU group to each GPU pool    320

Receiving a job and job information related to the job, wherein the job information indicates a number of GPUs required for performing the job    330

Selecting a corresponding GPU pool based at least on the job information    340

Determining available GPUs to be scheduled to the job in the selected GPU pool based at least on the job information    350

Scheduling the determined available GPU to the job    360

After the job is completed, releasing the GPU scheduled to the job back to the corresponding GPU pool    370

FIG.3

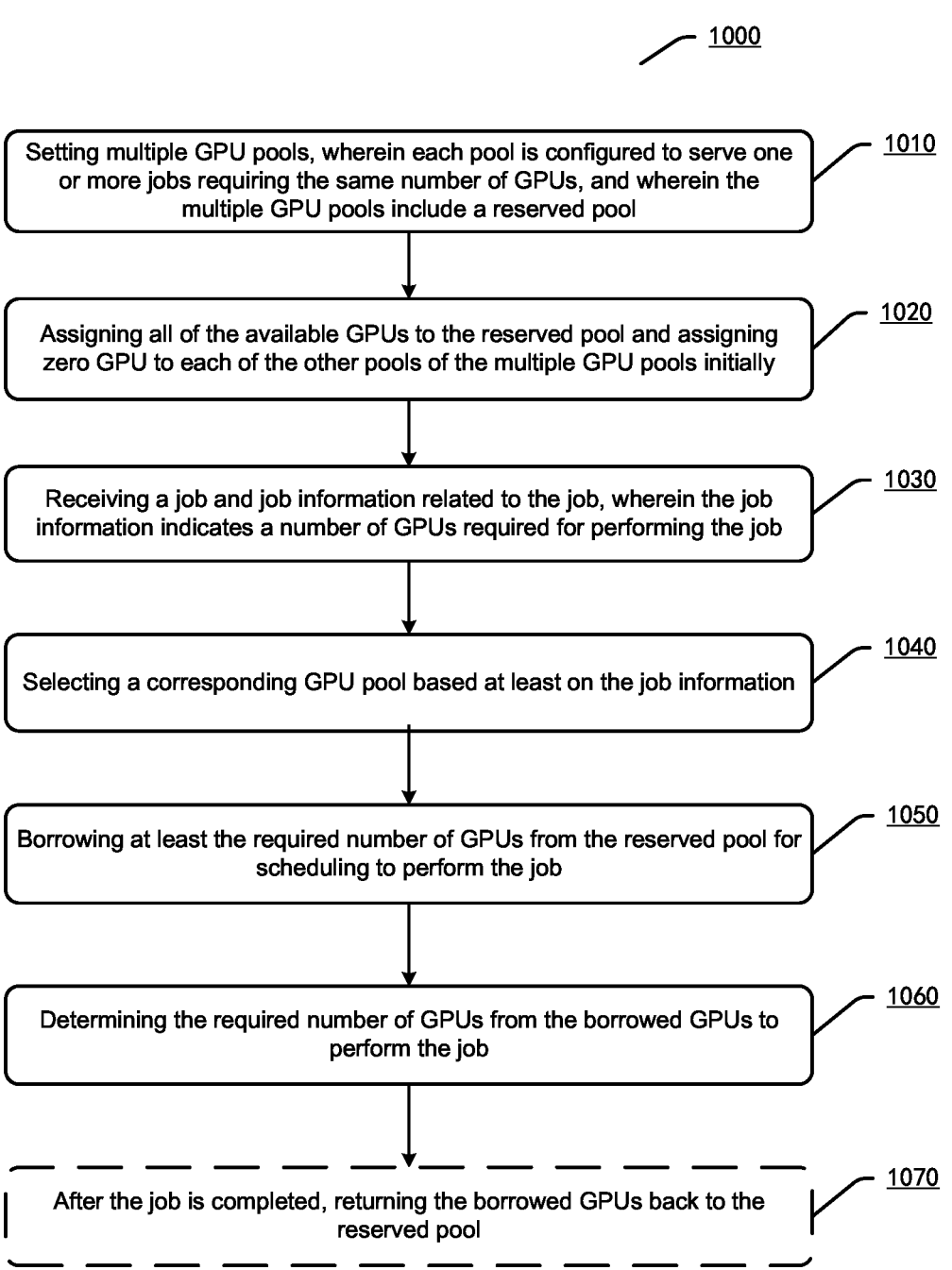

_1000_

Setting multiple GPU pools, wherein each pool is configured to serve one or more jobs requiring the same number of GPUs, and wherein the multiple GPU pools include a reserved pool
_1010_

Assigning all of the available GPUs to the reserved pool and assigning zero GPU to each of the other pools of the multiple GPU pools initially
_1020_

Receiving a job and job information related to the job, wherein the job information indicates a number of GPUs required for performing the job
_1030_

Selecting a corresponding GPU pool based at least on the job information
_1040_

Borrowing at least the required number of GPUs from the reserved pool for scheduling to perform the job
_1050_

Determining the required number of GPUs from the borrowed GPUs to perform the job
_1060_

After the job is completed, returning the borrowed GPUs back to the reserved pool
_1070_

FIG.10

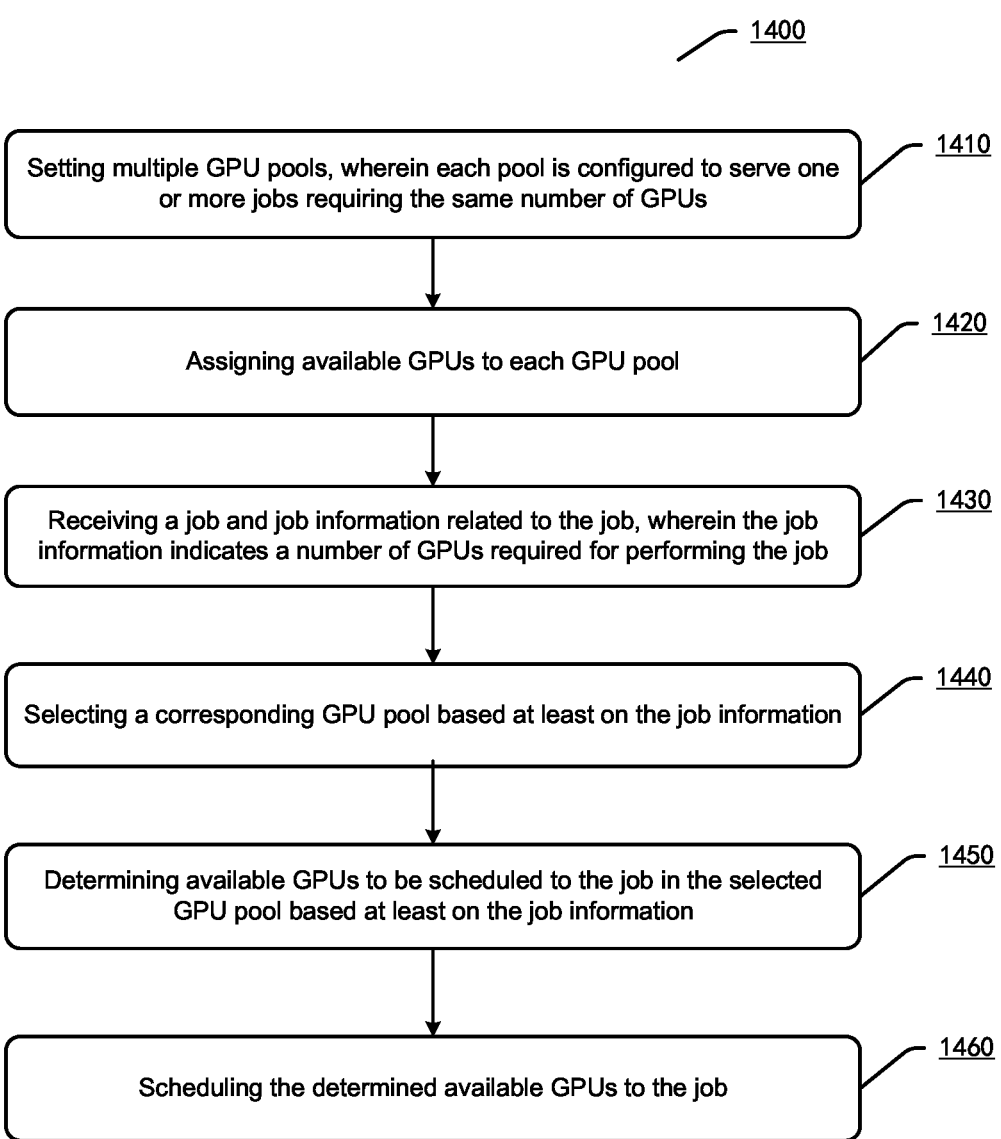

1400

Setting multiple GPU pools, wherein each pool is configured to serve one or more jobs requiring the same number of GPUs — 1410

Assigning available GPUs to each GPU pool — 1420

Receiving a job and job information related to the job, wherein the job information indicates a number of GPUs required for performing the job — 1430

Selecting a corresponding GPU pool based at least on the job information — 1440

Determining available GPUs to be scheduled to the job in the selected GPU pool based at least on the job information — 1450

Scheduling the determined available GPUs to the job — 1460

FIG.14

SCHEDULING OF A PLURALITY OF GRAPHIC PROCESSING UNITS

CROSS-REFERENCE TO RELATED APPLICATION

This application is a continuation of U.S. patent application Ser. No. 17/044,284, filed Sep. 30, 2020, which application is a U.S. National Stage Filing under 35 U.S.C. 371 of International Patent Application Serial No. PCT/US2019/ 030787, filed May 6, 2019, and published as WO 2019/ 221948 A1 on Nov. 21, 2019, which claims priority to Chinese Application No. 201810478340.3 filed May 18, 2018; which applications and publication are incorporated herein by reference in their entirety.

BACKGROUND

In an age of artificial intelligence (AI), application of graphic processing units (GPUs) has become more and more widespread. The graphic processing unit is a microprocessor that performs image computing operations on personal computers, workstations, game consoles, and some mobile devices such as tablets, smart phones, and the like. At present, GPUs play an important role in accelerating running speeds of software applications in areas such as artificial intelligence, automobiles, drones, and robots, and the like.

SUMMARY

This Summary is provided to introduce a group of concepts that are further described below in the Detailed Description. It is not intended to identify key features or essential features of the claimed subject matter, nor is it intended to be used to limit the scope of the claimed subject matter.

Embodiments of the present disclosure propose method and apparatus for scheduling a plurality of available graphics processing units (GPUs). Multiple GPU pools may be set, wherein each GPU pool is configured to serve one or more jobs requiring the same number of GPUs. Available GPUs may be assigned to each GPU pool. A job and job information related to the job may be received, wherein the job information indicates a number of GPUs required for performing the job. A corresponding GPU pool may be selected from the multiple GPU pools based at least on the job information. Available GPUs to be scheduled to the job in the selected GPU pool may be determined based at least on the job information. In addition, the determined available GPUs may be scheduled to the job.

It should be noted that the above one or more aspects include the following detailed description and features specifically pointed out in the claims. The following description and the appended drawings set forth in detail certain illustrative features of the one or more aspects. These features are merely indicative of various ways in which the principles of the various aspects may be implemented, and the disclosure is intended to include all such aspects and equivalent transformations thereof.

BRIEF DESCRIPTION OF THE DRAWINGS

The disclosed aspects will hereinafter be described in connection with the appended drawings that are provided to illustrate and not to limit the disclosed aspects.

FIG. 3 illustrates a flow diagram of an exemplary method for scheduling a plurality of GPUs, in accordance with an embodiment.

FIG. 10 illustrates a flow diagram of another exemplary method for scheduling a plurality of GPUs, in accordance with an embodiment.

FIG. 14 illustrates a flow diagram of an exemplary method for scheduling a plurality of available GPUs, in accordance with an embodiment.

DETAILED DESCRIPTION

Figure 1:
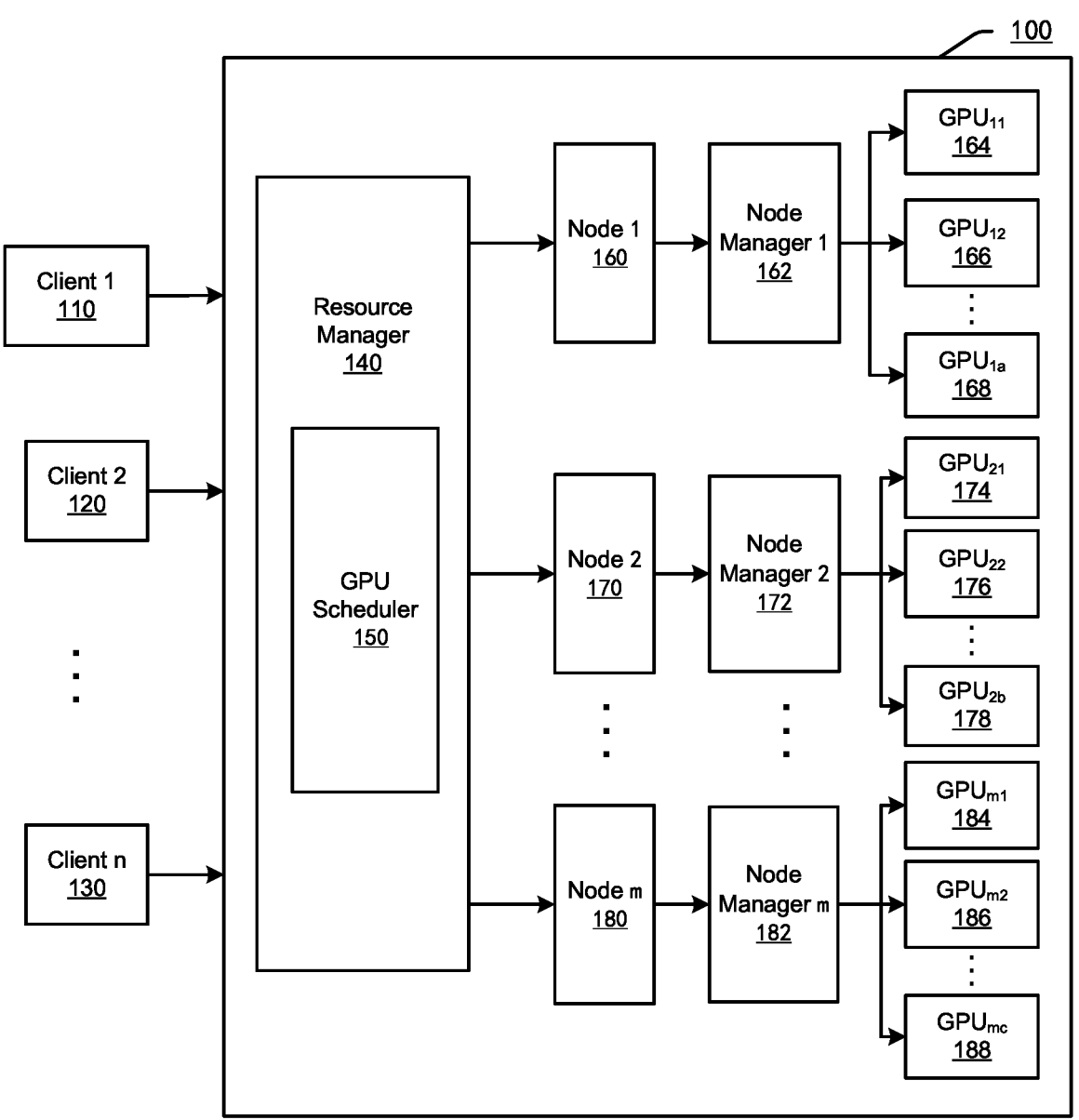
FIG. 1 illustrates an exemplary computing system in accordance with an embodiment.

The present disclosure will now be discussed with reference to several exemplary implementations. It is to be understood that these implementations are discussed only for enabling those skilled in the art to better understand and thus implement the embodiments of the present disclosure, rather than suggesting any limitations on the scope of the present disclosure.

In recent years, due to more and more rapid development of artificial intelligence (AI) and image processing, requirements for GPU-based computing systems are also increasing, computing systems need to be able to handle job requests of different sizes and be able to process jobs efficiently in busy or not busy states. However, when scheduling multiple GPU resources sequentially to process jobs with different sizes currently, resource conflicts or inter-job interference, such as conflicts of central processing unit (CPU), memory, input/output (I/O), network resources, etc., may occur when multiple jobs are simultaneously running on different GPUs of nodes with multiple GPUs, which may cause reduced GPU efficiency. For example, when one 8-GPU job is running on one 8-GPU node, there may be no resource conflicts, but two 4-GPU jobs or one 4-GPU job and one 2-GPU job running on one 8-GPU node simultaneously may result in the above resource conflicts. Herein, a node may also be referred to as a host, a host node, a server, etc., which may have at least one GPU group, in which each GPU group may have at least one GPU. The GPU group herein may also be referred to as a graphics card, a display adapter, a display accelerator card, and the like. That is, one host can have at least one graphics card. In addition, at least one GPU group and/or at least one node including at least one GPU may constitute a GPU pool, and multiple GPU pools may constitute one GPU cluster. Herein, n-GPU job represents a job to be performed by requiring n GPUs. For example, a 1-GPU job represents a job to be performed by requiring 1 GPU, a 4-GPU job represents a job to be performed by requiring 4 GPUs, a 8-GPU job represents a job to be performed by requiring 8 GPUs, and the like. Current GPU resource sequential scheduling technology seldom takes into account resource conflicts or inter-job interference caused by performing cross-jobs on GPU resources. In addition, after the performing of the job is completed by using the GPU scheduled according to the current GPU resource sequential scheduling technology, the released GPU may cause the GPU resource distribution to be disordered, thereby causing GPU resource fragmentation and reducing the GPU usage efficiency. Although the random scheduling approach of GPU resources has been studied at present to reduce inter-job interference caused when multiple jobs are simultaneously performed, random scheduling approach of GPU resources causes issue of fragmentation of GPU resources both during resource assignment and after resource release.

In order to solve the above issues of inter-job interference and GPU resource fragmentation, an embodiment of the present disclosure proposes a method for scheduling a plurality of available GPUs, which can reduce inter-job interference and make scheduling of GPU resources being very orderly, so that there is almost no GPU resource fragmentation during resource assignment and after resource release. Embodiments of the present disclosure are implemented by setting multiple GPU pools corresponding to multiple jobs in a computing system, and the multiple jobs herein refer to jobs classified according to a number of GPUs required to perform a job, for example, the multiple jobs may include 1-GPU jobs, 2-GPU jobs, 3-GPU jobs, 4-GPU jobs . . . n-GPU jobs, etc., where n represents an arbitrary non-zero integer.

FIG. 1 illustrates an exemplary computing system 100 in accordance with an embodiment. In FIG. 1, the computing system 100 may communicate with at least one client, such as client 1 110, client 2 120 . . . client n 130, and the like. The computing system 100 may receive GPU jobs submitted by a user from a client and schedule GPU resources to perform the jobs. In an embodiment of the present disclosure, the computing system 100 may include a resource manager 140, a GPU scheduler 150, at least one node 1 160, node 2 170 . . . node m 180, at least one node manager 1 162, node manager 2 172 . . . node manager m 182, and at least one GPU 164-188. It should be understood that the computing system 100 may also include any other components for resource scheduling and management; for simplicity, not all possible components in the computing system 100 are shown in this disclosure. For example, the computing system 100 may be an AI system, a resource management server system, a cloud computing system, and/or any system that provides computing resources.

In some examples, the GPU scheduler 150 is a plug-in module disposed in the resource manager 140 to assist the resource manager 140 in performing an appropriate resource assignment for job requests received from the client. Although in the example shown in FIG. 1, the GPU scheduler 150 is disposed within the resource manager 140, in other examples, the GPU scheduler 150 may also be configured to be placed separately from the resource manager 140. The resource manager 140 may be connected to a plurality of nodes 160, 170, 180, etc., to manage the GPUs included in the nodes, wherein each of the nodes is configured with at least one node manager, the node managers 162, 172, 182 as shown. The node managers 162, 172, 182 are used to manage at least one GPU included in the respective nodes, respectively, the GPUs 164-186 as shown in the figures. It should be understood that although not shown here, multiple GPUs included in each node may be divided into at least one GPU group, for example, node 1 160 may include multiple GPU groups, one GPU group of which may include $GPU_{11}$ 164 and $GPU_{12}$ 166, one GPU group may include $GPU_{1a}$ 168 and other GPUs. For the sake of simplicity, in the following description, an embodiment of the present disclosure is described by taking an 8-GPU node including 8 GPUs as an example.

It should be understood that all of the components or modules shown in FIG. 1 are exemplary. The term "exemplary" used in this application means serving as an example, illustration, or description. Any embodiment or design described as "exemplary" in this application should not be construed as preferred or advantageous over other embodiments or designs. Rather, the use of an exemplary term is intended to convey an idea in a specific manner. The term "or" used in this application means an inclusive "or" rather than an exclusive "or". That is, "X uses A or B" means any natural inclusive permutation unless otherwise specified or clear from the context. That is, if X uses A, X uses B, or X uses both A and B, then "X uses A or B" satisfies any of the above examples. In addition, "a" and "an" items used in this application and the appended claims usually mean "one or more", unless otherwise specified or clear from the context that it is a singular form.

As used in this application, the terms "component," "module," "system," and similar terms mean a computer-related entity, which may be hardware, firmware, a combination of hardware and software, software, or software in execution. For example, a component can be, but is not limited to being, a process running on a processor, a processor, an object, an executable program, a thread of execution, a program, and/or a computer. For case of illustration, both an application program running on a computing device and the computing device itself can be components. A process and/or thread in execution may have one or more components, and one component may be located on one computer and/or distributed among two or more computers. In addition, these components can be executed from a variety of computer readable media that store a variety of data structures.

Figure 2A:
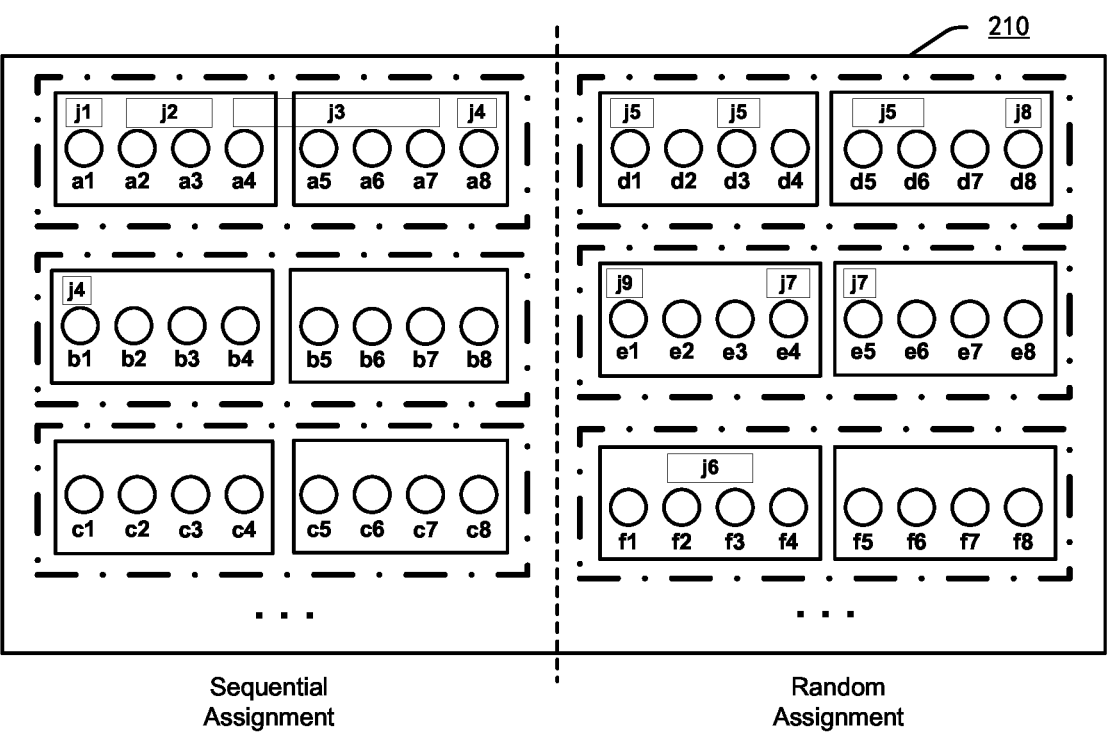
FIG. 2A-2B illustrate schematic diagrams of GPU resource assignment and GPU resource release using a current GPU resource scheduling manner.
Figure 2B:
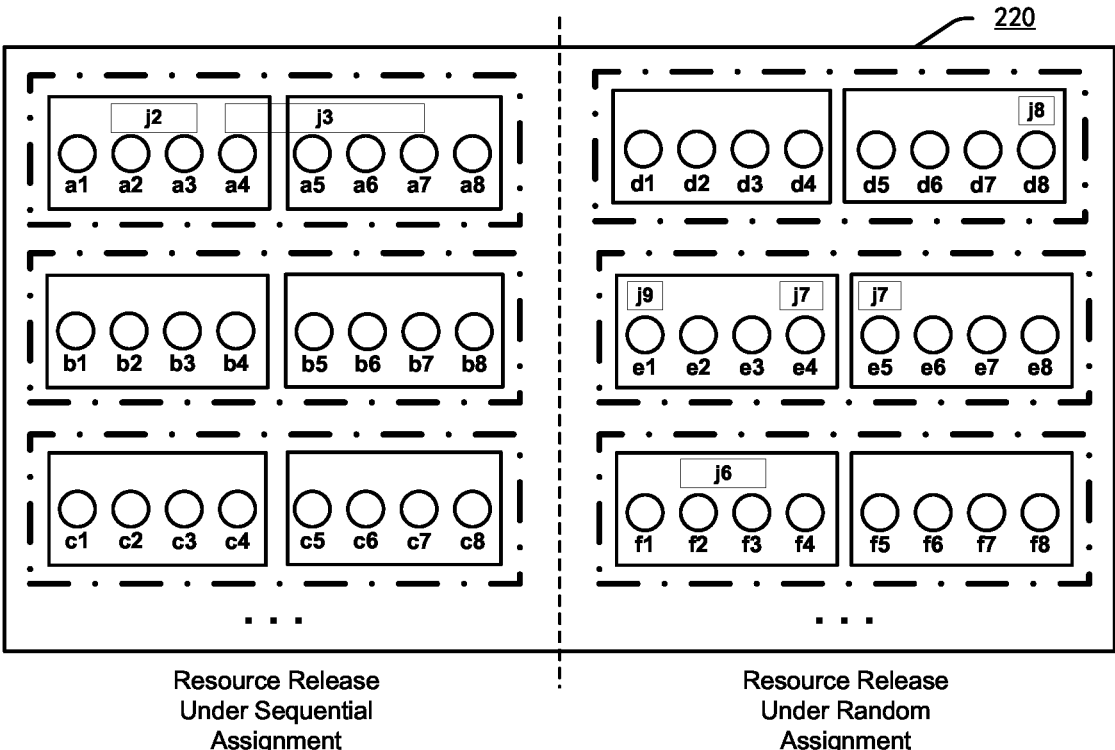

FIG. 2A-2B illustrate schematic diagram 210 of GPU resource assignment and schematic diagram 220 of GPU resource release using a current GPU resource scheduling approach.

To facilitate the description of the current different resource assignment approaches, the left side of FIG. 2A shows an exemplary sequential resource assignment approach, and the right side shows an exemplary random resource assignment approach. In the example shown in FIG. 2A, each circle represents a GPU, a solid line block formed by four circles represents a GPU group, and a dotted line block formed by two solid line blocks represents a 8-GPU node, that is, each 8-GPU node includes 2 GPU groups, and each GPU group includes 4 GPUs. In this example, the circles a1, b2, d8, and e1 filled with diagonal lines represent four GPUs that are performing four 1-GPU jobs respectively, (a2, a3), (a8, b1), (b3, b4), (c4, c5), (f2, f3) filled with squares represent five GPU sets that are performing five 2-GPU jobs respectively, (a4, a5, a6, a7), (b5, b6, b7, b8), (d1, d3, d5, d6) filled with shades represent 3 GPU sets that are performing three 4-GPU jobs respectively.

Reference is made to the exemplary "sequential assignment" approach of the left portion of FIG. 2A. First, when a job j1, which is a 1-GPU job, is received, available GPU a1 may be assigned to perform the 1-GPU job j1; next, when a job j2, which is a 2-GPU job, is received, available GPU a2 and GPU a3 may be assigned sequentially to perform the 2-GPU job j2; then when a job j3, which is a 4-GPU job, is received, available GPU a4 to GPU a7 may be assigned sequentially to perform the 4-GPU job j3, wherein GPU a4 and GPU a5, GPU a6, and GPU a7 are distributed in different GPU groups of the same node; continue when a job j4, which is a 2-GPU job, is received, available GPU a8 and GPU b1 may be assigned sequentially to perform the 2-GPU job j4, wherein GPU a8 and GPU b1 are distributed in different nodes, and so on. According to the example of FIG. 2A, when performing multiple jobs on closely adjacent multiple GPUs, such as, 1-GPU job j1, 2-GPU job j2, 4-GPU job j3, 2-GPU job j4, adjacent jobs of these jobs may interfere with each other and result in resource conflicts during execution.

Continuing with the exemplary "sequential assignment" approach, referring to FIG. 2B, when performing job j1 and job j4 is finished, the GPU resources GPU a1, GPU a8, and GPU b1 occupied by the job j1 and job j4 are released. Since the example is implemented in sequential assignment approach, when a new job is received, the GPU c1 and the subsequent GPU(s) are sequentially scheduled to execute the new job, which may cause the GPU a1, GPU a8, and GPU b1 cannot be utilized, thereby forming GPU resource fragments.

Referring back to the exemplary "random assignment" approach of the right portion of FIG. 2A. First, when a job j5, which is a 4-GPU job, is received, available GPU d1, GPU d3, GPU d5, GPU d6 may be assigned randomly to perform the 4-GPU job j5, wherein GPU d1, GPU d3 and GPU d5, GPU d6 are distributed in different GPU groups of the same node; continue when a job j6, which is a 2-GPU job, is received, available GPU f2 and GPU f3 may be assigned randomly to perform the 2-GPU job j6, wherein GPU f2 and GPU f3 are distributed in the same GPU group of the same node; then when a job j7, which is a 2-GPU job, is received, available GPU e4 and GPU e5 may be assigned to perform the 2-GPU job j7, wherein GPU e4 and GPU e5 are distributed in different GPU groups of the same node; continue when a job j8, which is a 1-GPU job, is received, available GPU d8 may be assigned to perform the 1-GPU job j8; and when a job j9, which is a 1-GPU job, is received, GPU e1 may be assigned to perform the 1-GPU job j9. According to the example of FIG. 2A, when multiple jobs are randomly performed on multiple nodes, it may cause some of the GPUs, such as GPU d2, GPU d4, GPU d7, GPU c2, GPU e3, etc. in FIG. 2A, cannot be utilized, thereby forming GPU resource fragments.

Continuing with the exemplary "random assignment" approach, referring to FIG. 2B, even after the job j5 is performed, the GPU resources GPU d1, GPU d3, GPU d5, and GPU d6 occupied by the job j5 are released. There are still some GPU resource fragments in the "Resource Release under Random Assignment" section in a resource map shown in FIG. 2B.

It can be seen that neither the current sequential assignment approach nor the random assignment approach can solve the issues of GPU resource fragmentation and interference among multiple jobs at the same time.

Embodiments of the present disclosure propose a method of scheduling a plurality of available GPUs by setting multiple GPU pools corresponding to a variety of jobs in a computing system. FIG. 3 illustrates a flow diagram of an exemplary method 300 for scheduling a plurality of GPUs, in accordance with an embodiment.

At 310, multiple GPU pools may be set, wherein each pool is configured to serve one or more jobs requiring the same number of GPUs, for example, multiple GPU pools correspond to a variety of jobs respectively, which are classified based on the number of GPUs required to perform the job. For example, a job requiring 1 GPU is classified as a 1-GPU job, which corresponds to a 1-GPU pool; a job requiring 2 GPUs is classified as a 2-GPU job, which corresponds to a 2-GPU pool; a job requiring 4 GPUs is classified as a 4-GPU job, which corresponds to a 4-GPU pool; a job requiring n GPUs is classified as a n-GPU job, which corresponds to a n-GPU pool, where n may be any non-zero positive integer. In the embodiment of the present disclosure, for convenience of description, a 1-GPU pool, a 2-GPU pool, and a 4-GPU pool are set herein. It should be understood that the three GPU pools set herein are merely exemplary, and in other examples, multiple arbitrary GPU pools may be set as needed, such as 1-GPU pool, 2-GPU pool, 3-GPU pool, 4-GPU pool, 5-GPU pool, and the like.

At 320, at least one available GPU group is assigned to each GPU pool, where at least one available GPU is included in each GPU group. In this example, the number of GPU groups assigned for multiple GPU pools may be the same or different, and the number of GPUs in each GPU group may be the same or different. In an exemplary embodiment, each GPU pool may be assigned a GPU group according to predetermined conditions. For example, the number of GPUs required to perform 4-GPU jobs is greater than that required to perform 1-GPU jobs and 2-GPU jobs, so more GPU groups may be assigned to the 4-GPU pool. As another example, in some cases, the number of 1-GPU jobs to be performed by the user is greater than that required to perform 2-GPU jobs and 4-GPU jobs, so more GPU groups may be assigned to the 1-GPU pool. In some embodiments, all of the available GPUs or GPU groups in the system may be pre-assigned to multiple GPU pools. In other embodiments, a number of GPU groups assigned to each GPU pool is adjustable.

At 330, a job and job information related to the job are received, wherein the job information indicates a number of GPUs required for performing the job. For example, a job is received from a user along with job information indicating that the performing of the received job requires 4 GPUs, i.e., the job is a 4-GPU job.

At 340, a corresponding GPU pool is selected based at least on the job information. In an embodiment, if it is determined that there is a corresponding GPU pool in the multiple GPU pools according to the number of GPUs required for performing the received job and indicated by the job information, the corresponding GPU pool is selected. For example, if the job information indicates that the job is a 4-GPU job, a 4-GPU pool is selected from multiple GPU pools to perform the job. Additionally or optionally, if it is determined that there is not a corresponding GPU pool in the multiple GPU pools according to the number of GPUs required for performing the received job and indicated by the job information, selecting one or more GPU pools from the multiple GPU pools, a number of GPUs used for performing a job in the selected one or more GPU pools being greater than the number of GPUs required for performing the received job. For example, in one example, if the multiple pools set include a 1-GPU pool, a 2-GPU pool, and a 4-GPU pool, and the job information indicates that the received job is a 3-GPU job, then the 4-GPU pool is selected to perform this 3-GPU job.

At 350, available GPUs to be scheduled to the job in the selected GPU pool are determined based at least on the job information. In some embodiments, if more than one GPU are required to be scheduled, more than one, closely adjacent multiple GPUs are preferably determined to perform the job. For example, if the job is known to be a 4-GPU job based on the job information, then it may be determined that four closely adjacent GPUs are to be scheduled in the selected 4-GPU pool. Preferably, the four closely adjacent GPUs are in the same GPU group, or in the same node. In an embodiment of the present disclosure, the available GPUs to be scheduled for the job may be determined in the selected GPU pool through any means. Preferably, the available GPUs to be scheduled to the job are determined in the selected GPU pool through at least one of the following: in any manner of reducing interference between multiple jobs, for example, making GPUs that perform different jobs in the same GPU pool to spread out as far as possible; in any manner of reducing the cost of communication between GPUs, for example, for different jobs, selecting different GPUs in the same GPU group of the same node; and in any manner of reducing the cost of central processing unit (CPU)-GPU communication, for example, for different jobs, select different GPUs in the same node or GPUs in different GPU groups.

At 360, the determined available GPU is scheduled to the job to perform the job.

Optionally, at 370, after the job is completed, the GPU(s) scheduled to the job is released back to the corresponding GPU pool. For example, if the received job is a 4-GPU job, then after the 4-GPU job is performed, the 4 GPUs scheduled from the 4-GPU pool to perform the 4-GPU job are released back to the 4-GPU pool. As another example, if the received job is a 3-GPU job, then after the 3-GPU job is performed, the 3 GPUs scheduled from the 4-GPU pool according to the above operation to perform the 3-GPU job are released back to the 4-GPU pool.

A schematic diagram of exemplary GPU resource assignment and release will be described below with reference to the method 300 of FIG. 3.

Figure 4:
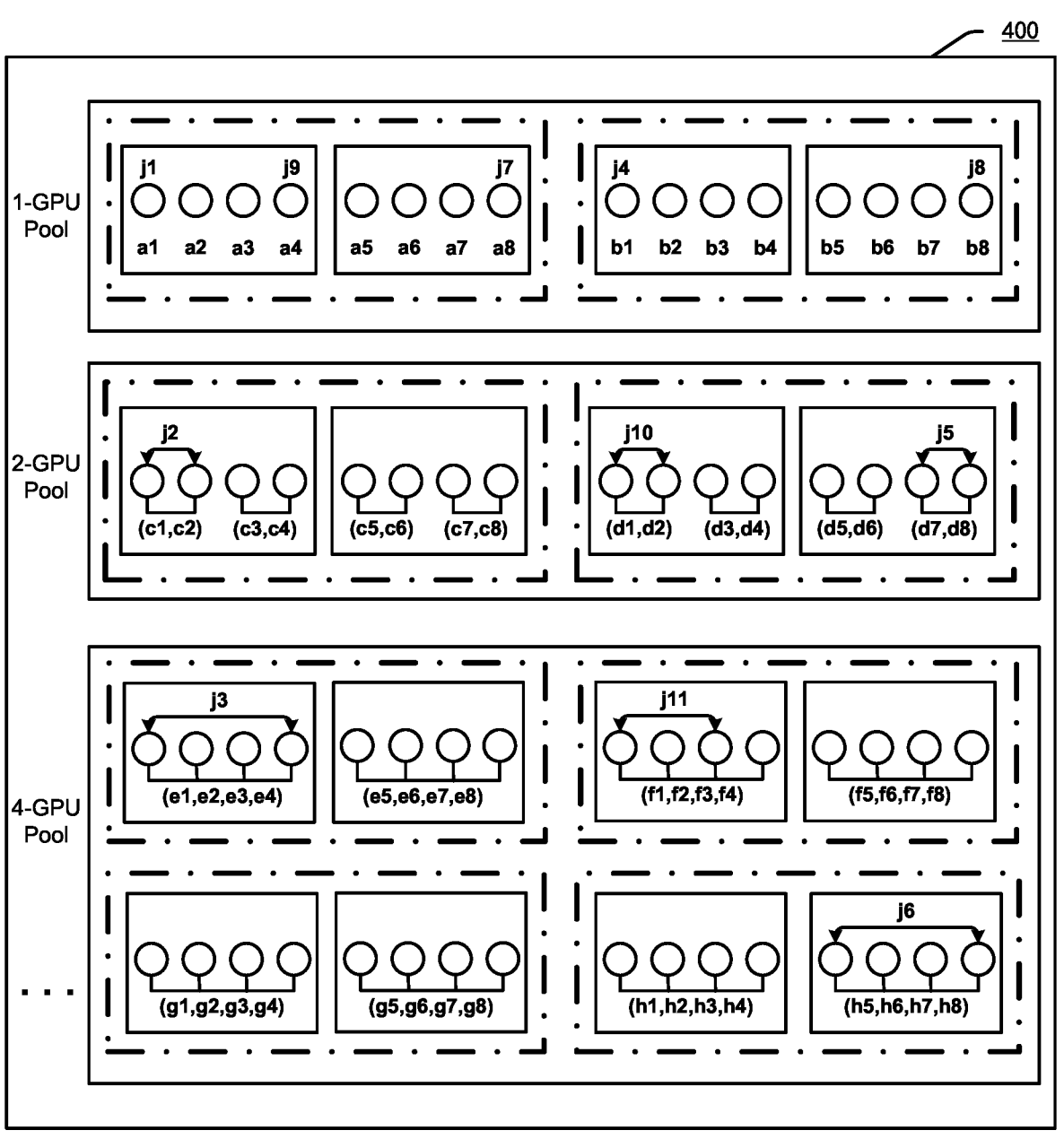
FIG. 4 illustrates a schematic diagram of an exemplary GPU resource assignment based on the exemplary method of FIG. 3, in accordance with an embodiment.

FIG. 4 illustrates a schematic diagram 400 of an exemplary GPU resource assignment based on the exemplary method of FIG. 3, in accordance with an embodiment.

As shown in FIG. 4, multiple GPU pools are set in the system, such as a 1-GPU pool, a 2-GPU pool, and a 4-GPU pool, where the 1-GPU pool is used to serve 1-GPU jobs, the 2-GPU pool is used to serve 2-GPU jobs, and the 4-GPU pool is used to serve 4-GPU jobs. Each GPU pool is assigned with multiple nodes, each node including multiple GPU groups, each GPU group including multiple GPUs. In the example of FIG. 4, each node is represented by a dotted line box and includes 2 GPU groups, each GPU group is represented by a solid line box and includes 4 GPUs, and each GPU is represented by a circle. In this example, the 1-GPU pool is assigned with 2 nodes, the 2-GPU pool is assigned with 2 nodes, and the 4-GPU pool is assigned with 4 nodes.

When a job j1 and its job information are received, the job j1 is determined to be a 1-GPU job according to the indication of its job information, thereby the 1-GPU pool being selected to serve the job j1. Multiple GPU jobs are shown in the example of FIG. 4, such as 1-GPU jobs, 2-GPU jobs, 3-GPU jobs, 4-GPU jobs, where the GPUs occupied by the 1-GPU jobs are represented by circles filled with slashes, the GPUs occupied by the 2-GPU jobs are represented by circles filled with squares, the GPUs occupied by the 3-GPU jobs are represented by circles filled with horizontal lines, and the GPUs occupied by the 4-GPU jobs are represented by circles filled with shades. When a job j1 is received, there are multiple available GPUs in the selected 1-GPU pool. In this example, it is determined by any of the approaches mentioned above that GPU a1 can be scheduled to service job j1, and GPU a1 is scheduled for that job j1.

When the job j2 and its job information are received, the job j2 is determined to be a 2-GPU job according to the indication of its job information, thereby the 2-GPU pool being selected to serve the job j2. When a job j2 is received, there are multiple available GPUs in the selected 2-GPU pool. In this example, it is determined by any of the approaches mentioned above that the GPU c1 and GPU c2 can be scheduled to service job j2 and these two GPUs are scheduled for that job j2.

When the job j3 and its job information are received, the job j3 is determined to be a 4-GPU job according to the indication of its job information, thereby the 4-GPU pool being selected to serve the job j3. When a job j3 is received, there are multiple available GPUs in the selected 4-GPU pool. In this example, it is determined by any of the approaches mentioned above that the GPU e1, GPU e2, GPU e3 and GPU e4 can be scheduled to service job j3 and these four GPUs are scheduled for that job j3.

When a job j4 and its job information are received, the job j4 is determined to be a 1-GPU job according to the indication of its job information, thereby the 1-GPU pool being selected to serve the job j4. When a job j4 is received, GPU a1 in the selected 1-GPU pool has been assigned to perform the job j1. In this example, to reduce interference and resource conflicts between jobs j1 and j4, it is determined that GPU b1, which is in a different node from GPU a1, can be scheduled to serve job j4 and this GPU is scheduled for that job j4. Similarly, when a 2-GPU job j5 is received, the 2-GPU pool is selected. For example, to reduce interference and resource conflicts between jobs j2 and j5, it is determined that the GPU d7 and GPU d8, which are in a different node from GPU c1 and GPU c2 that perform the job j2, can be scheduled to perform the job j5 and these two GPUs are scheduled for that job j5. Similarly, when a 4-GPU job j6 is received, it is determined that 4 GPUs in a 4-GPU pool, i.e., GPU h5, GPU h6, GPU h7 and GPU h8, can be scheduled to perform the job j6.

Further, when a 1-GPU job j7 is received, since there are GPUs already being occupied in each node of the 1-GPU pool at this time to perform the job, such as GPU a1 for performing the job j1 in one node and GPU b1 for performing the job j4 in another node, GPUs in different GPU groups in the same node may be selected to perform the job j7, such as GPU a8 in the same node as GPU a1 but in a different GPU group, to reduce interference between jobs and reduce costs of communications between CPUs and GPUs. Similarly, when a 1-GPU job j8 is received, it can be determined that GPU b8 is scheduled to perform the job j8, where this GPU b8 is in a different node from GPU a1 and GPU a4, and in the same node as GPU b1 but in different GPU groups. Similarly, when a 2-GPU job j10 is received, it is determined in a similar way that GPU d1 and GPU d2 are scheduled to perform the job j10, where GPU d1 and GPU d2 are in a different node from GPU c1 and GPU c2 used to perform other 2-GPU job j2, and in the same node as GPU d7 and GPU d8 used to perform other 2-GPU job j5 but in different GPU groups.

Additionally, when a 1-GPU job j9 is received, since there are GPUs already being occupied in each GPU group of each node of the 1-GPU pool at this time to perform the job, such as GPU a1 for performing the job j1 in one GPU group of one node and GPU a8 for performing the job j7 in another GPU group of the same node, and GPU b1 for performing the job j4 in one GPU group of another node and GPU b8 for performing the job j8 in another GPU group of the same node, other GPUs in the same GPU group can be selected to perform the job j9, such as GPU a4 in the same GPU group as GPU a1, to reduce interference between jobs and reduce costs of communications between GPUs.

In addition, in the example of FIG. 4, when a 3-GPU job j11 is received, 4-GPU pool can be selected, and in the selected 4-GPU pool, 3 GPUs i.e., GPU f1, GPU f2, GPU f3, that are not in the same node as the GPU for performing other jobs, are determined to perform the job j11.

Figure 5:
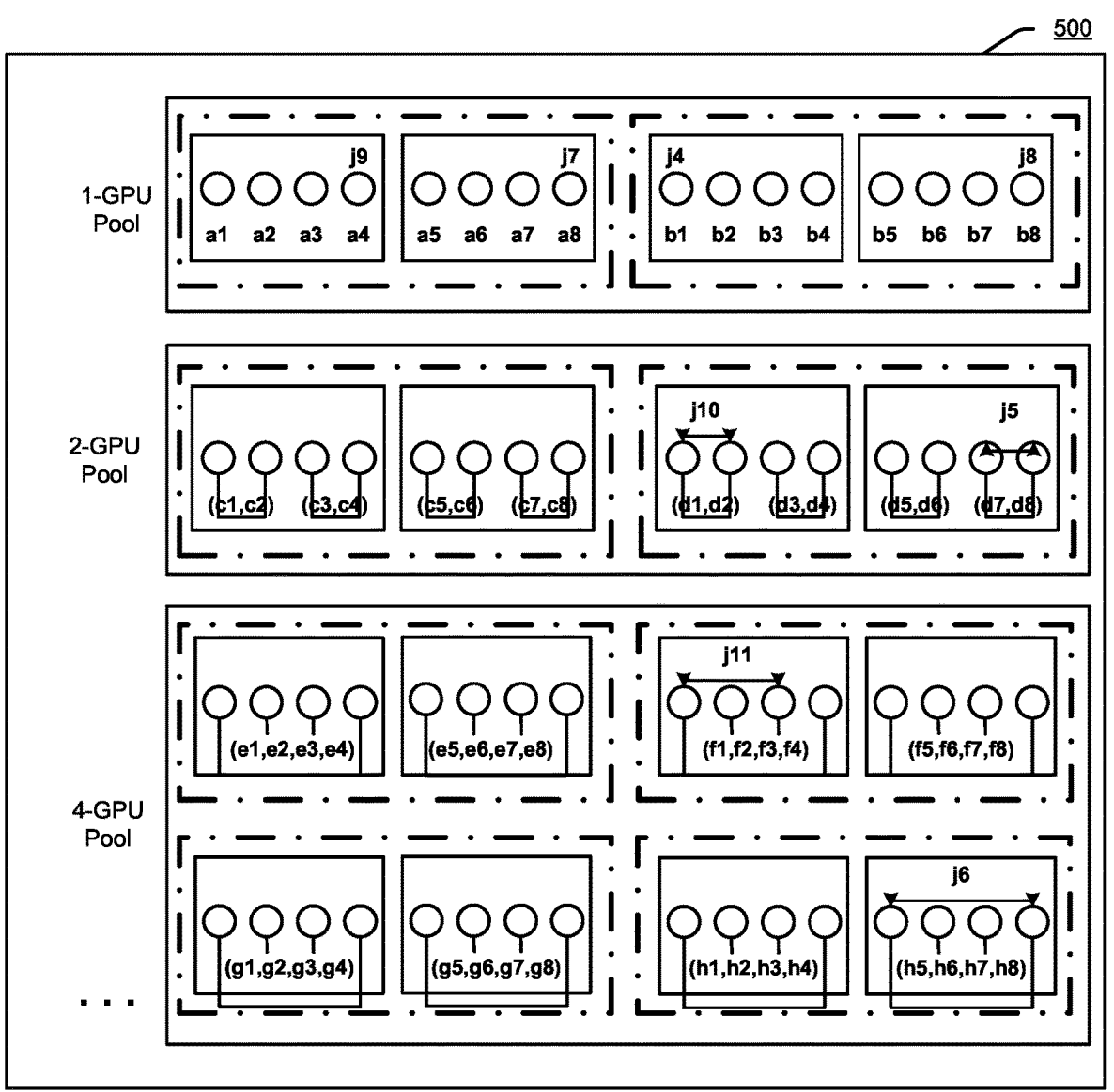
FIG. 5 illustrates a schematic diagram of exemplary GPU resource release, based on the exemplary GPU resource assignment of FIG. 4, in accordance with an embodiment.

FIG. 5 illustrates a schematic diagram 500 of exemplary GPU resource release, based on the exemplary GPU resource assignment of FIG. 4, in accordance with an embodiment.

Compared with the GPU resource assignment of FIG. 4, in FIG. 5, the 1-GPU job j1, the 2-GPU job j2, and the 4-GPU job j3 have been performed, thus, the GPU resource GPU a1 for performing the 1-GPU job j1 is released back to the 1-GPU pool, and the GPU c1 and GPU c2 for performing the 2-GPU job j2 are released back to the 2-GPU pool, and the GPU e1, GPU e2, GPU e3 and GPU e4 for performing the 4-GPU job j3 are released back to the 4-GPU pool. Referring to the schematic diagram 500 of GPU resource release of FIG. 5, there is almost no GPU resource fragmentation in the GPU pool-based GPU resource scheduling approach by utilizing the embodiments of the present disclosure, and the interference between jobs is also small.

Additionally or optionally, a reservation pool may also be set when setting up a GPU pool. The GPU resource scheduling scenario in the case where a reservation pool is set will be described below.

Figure 6:
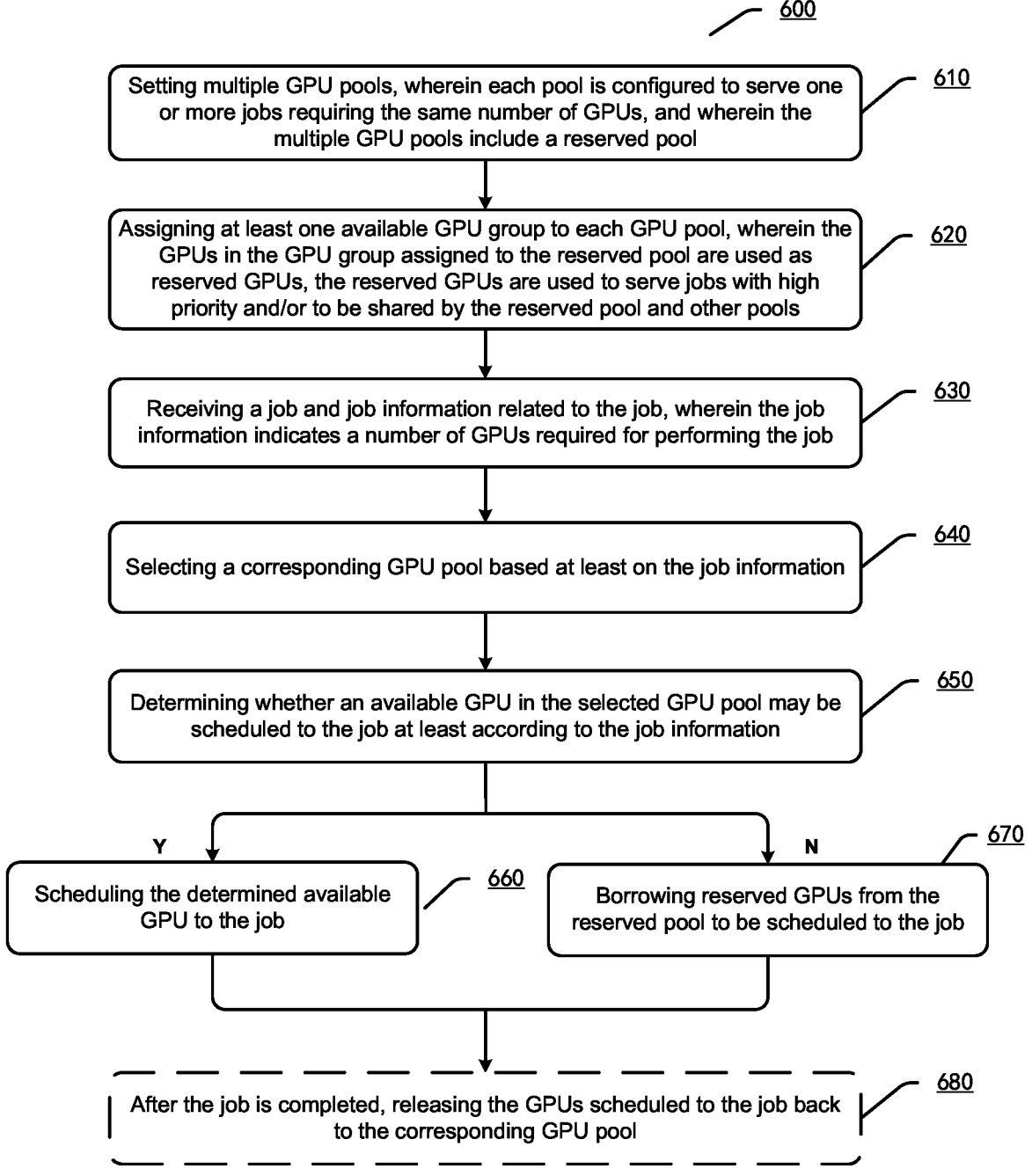
FIG. 6 illustrates a flow diagram of another exemplary method for scheduling a plurality of GPUs, in accordance with an embodiment.

FIG. 6 illustrates a flow diagram of another exemplary method 600 for scheduling a plurality of GPUs, in accordance with an embodiment.

At 610, multiple GPU pools are set, wherein each pool is configured to serve one or more jobs requiring the same number of GPUs, and wherein the multiple GPU pools include reserved pools.

At 620, at least one available GPU group is assigned to each GPU pool, wherein the GPUs in the GPU group assigned to the reserved pool are used as reserved GPUs, and the reserved GPUs are to serve jobs with high priority and/or to be shared by the reserved pool and other pools. For example, in some examples, when a 8-GPU job is set to a job with high priority, the reserved GPUs in the reservation pool may be used to serve 8-GPU job. In other examples, when there is no job being set with high priority, the reserved GPUs in the reserved pool may be lent to other pools when required by other pools. For example, when the set other pools, such as 1-GPU pool, 2-GPU pool, 4-GPU pool, satisfy predetermined conditions, at least one reserved GPU in the reserved pool is lent to other pools that satisfy predetermined conditions. In some examples, the predetermined condition may include at least one of: a number of remaining GPUs in the other pools being less than a threshold; interference among jobs performed in the other pools being above a threshold; and waiting time of pending jobs in the other pools being above a threshold.

In some examples, at least one available GPU may be pre-assigned to each GPU pool when at least one available GPU group is assigned to each GPU pool. Alternatively or additionally, in some examples, all available GPUs may be assigned to the reservation pool and zero available GPU may be assigned to each of the other GPU pools initially.

At 630, a job and job information related to the job are received, wherein the job information indicates a number of GPUs required for performing the job. This operation is similar to 330 of FIG. 3.

At 640, a corresponding GPU pool is selected based at least on the job information. This operation is similar to 340 of FIG. 3.

At 650, at least according to the job information, it is determined whether an available GPU in the selected GPU pool can be scheduled to the job. For example, it may be determined whether an available GPU can be scheduled to perform the job by at least one of: whether a number of remaining GPUs in the selected pool being less than a threshold; whether interference among jobs performed in the selected pool being above a threshold; and whether waiting time of pending jobs in the selected pool being above a threshold.

If it is determined that an available GPU in the selected GPU pool can be scheduled to the job, then it may proceed to 660, where the determined available GPU is scheduled to the job. This scheduling operation is similar to 360 of FIG. 3.

If it is determined that no available GPU in the selected GPU pool can be scheduled to the job, for example, the number of remaining GPUs in the selected pool being less than a threshold, and/or the interference among jobs performed in the selected pool being above a threshold, and/or the waiting time of pending jobs in the selected pool being above a threshold, then it may proceed to 670, where a reserved GPU is borrowed from the reserved pool to be scheduled to perform the job. For instance, in some examples, if a new 1-GPU job is received and no GPU is available in the 1-GPU pool, then the reserved GPUs may be borrowed from the reserved pool to perform the new job. In other examples, if a new 2-GPU job is received and using the remaining available GPUs in the 2-GPU pool to perform a new 2-GPU job may cause significant interference to other ongoing 2-GPU jobs, then the reserved GPUs may be borrowed from the reserved pool to perform the new 2-GPU job. In still other examples, if a new 4-GPU job is received and the new job has not been assigned GPU resources after waiting for a long time, then the reserved GPUs may be borrowed from the reserved pool to perform the new 4-GPU job.

Optionally or additionally, at 680, after the job is completed, the GPU scheduled to the job is released back to the corresponding GPU pool. For example, if no reserved GPUs are borrowed from the reserved pool, then the scheduled GPU is released back to the original GPU pool; if the reserved GPUs are borrowed from the reserved pool, then the borrowed reserved GPUs are released back to the reserved pool. Alternatively or additionally, the borrowed reserved GPUs may not be returned for the time being, but the borrowed reserved GPUs are released to the GPU pool for performing the job for later use.

A schematic diagram of exemplary GPU resource assignment and resource release involving a reservation pool will be described below with reference to method 600 of FIG. 6.

Figure 7:
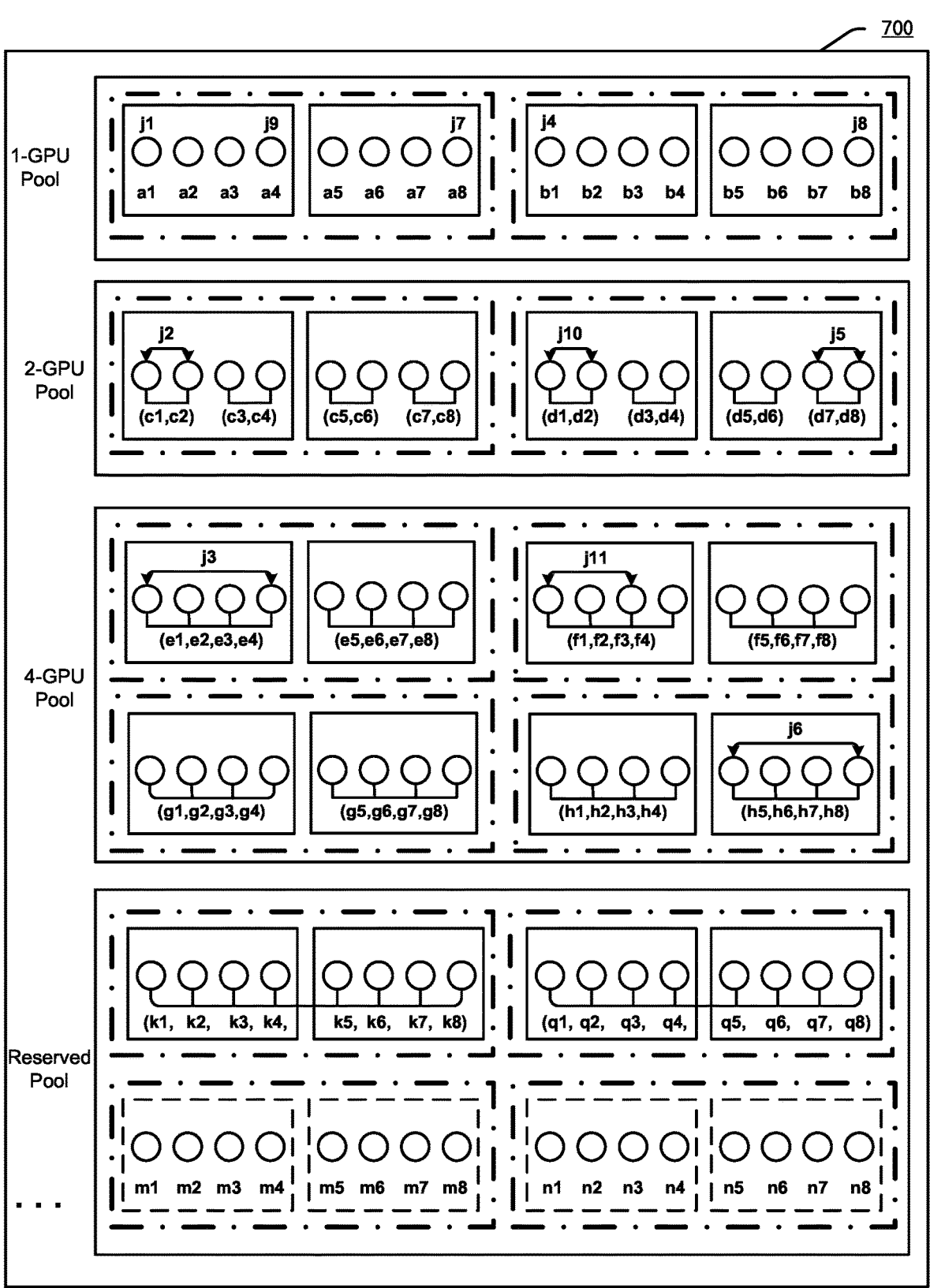
FIG. 7 illustrates a schematic diagram of an exemplary GPU resource assignment based on the exemplary method of FIG. 6, in accordance with an embodiment.

FIG. 7 illustrates a schematic diagram 700 of an exemplary GPU resource assignment based on the exemplary method 600 of FIG. 6, in accordance with an embodiment.

The schematic diagram 700 of FIG. 7 is similar to the schematic diagram 400 of GPU resource assignment in FIG. 4, except that there is a reserved pool in FIG. 7, where the reserved pool includes 4 nodes, each of the nodes including 2 GPU groups, and each of the GPU groups including 4 GPUs, wherein the node including the GPUs k1-k8 and the node including the GPUs q1-q8 are reserved for dedicated to perform 8-GPU job, and GPUs m1-m8, n1-n8 in a node including GPUs m1-m8 and a node including GPU n1-n8 may be reserved for being shared by a reserved pool, a 1-GPU pool, a 2-GPU pool, and a 4-GPU pool in FIG. 7. It should be understood that although it is shown in FIG. 7 that the GPUs k1-k8, q1-q8 in the reserved pool are dedicated to perform 8-GPU job, and the GPUs m1-m8, n1-n8 may be shared by the reserved pool and other pools, but in other examples, all reserved GPUs in the reserved pool can be reserved to be dedicated to perform jobs with high priority, or all reserved GPUs can be shared by the reserved pool and other pools, or some of the reserved GPUs are dedicated to perform other jobs, and some of the reserved GPUs are shared by multiple pools.

Figure 8:
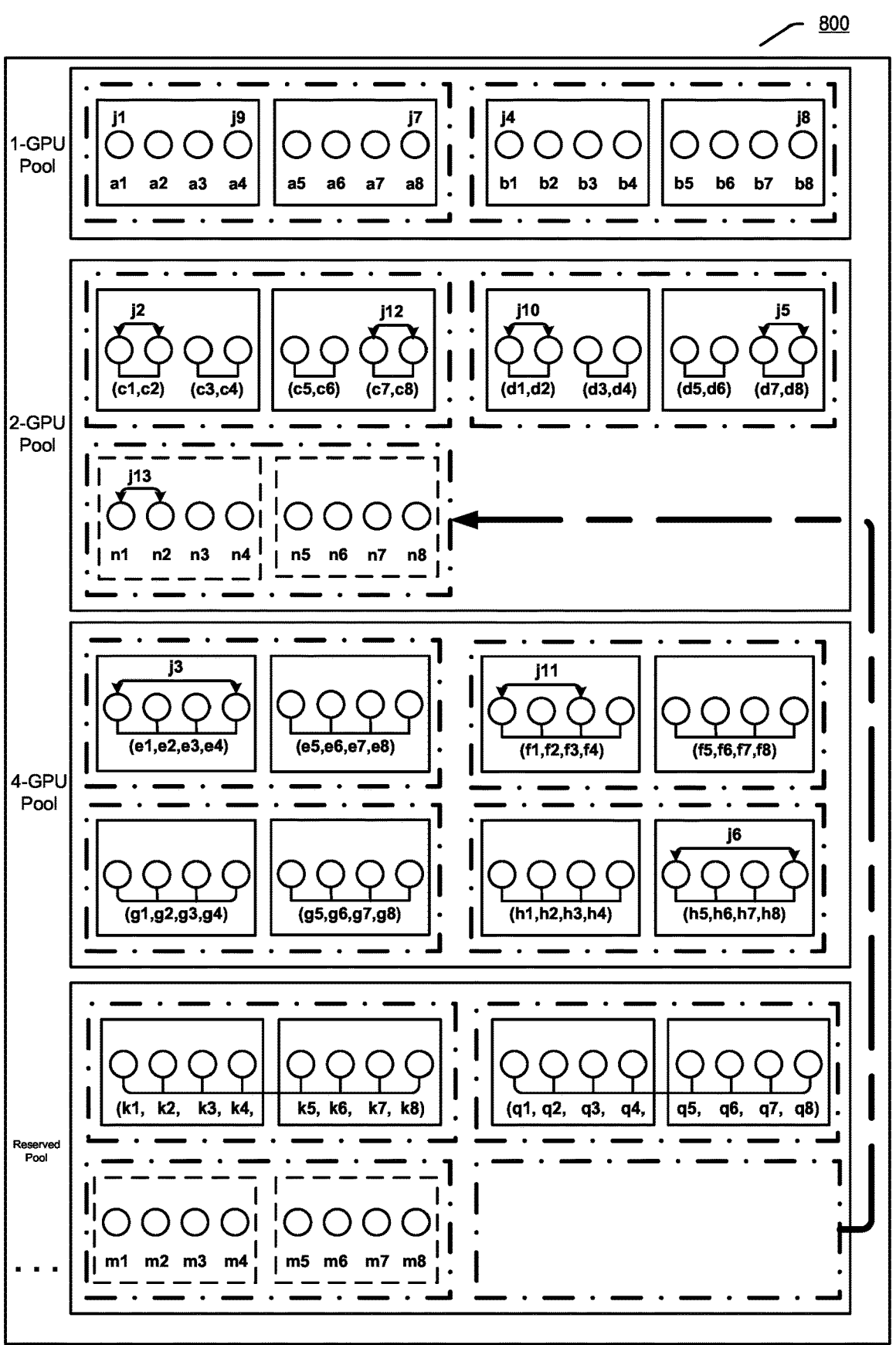
FIG. 8 illustrates a schematic diagram of an exemplary GPU resource assignment involving GPU borrowing based on the exemplary method of FIG. 6, in accordance with an embodiment.

FIG. 8 illustrates a schematic diagram 800 of an exemplary GPU resource assignment involving GPU borrowing based on the exemplary method 600 of FIG. 6, in accordance with an embodiment.

In the example shown in FIG. 8, all four GPU groups in the current 2-GPU pool are performing jobs, such as jobs j2, j5, j10, j12, and a new 2-GPU job j13 is received. If the new job j13 is assigned to any of the existing 4 GPU groups, then it will cause interference to the job being performed. It can be considered that no GPU available in the current 2-GPU pool can be assigned to the new job j13. Therefore, GPUs may be borrowed from the reserved pool to perform the new job j13, as indicated by the dashed arrow in FIG. 8. In some examples, borrowing GPU may be performed in the form of a node borrowing, as shown, nodes including GPUs n1-n8 may be borrowed. Optionally or additionally, borrowing GPU may be performed in the form of a GPU group borrowing, for example, GPU group including GPUs n1-n4 may be only borrowed, which is not shown in the figure. Further, borrowing GPU may be performed in the form of a GPU borrowing, for example, GPU n1, GPU n2 may be only borrowed to perform the job j13, which is not shown in the figure.

Figure 9:
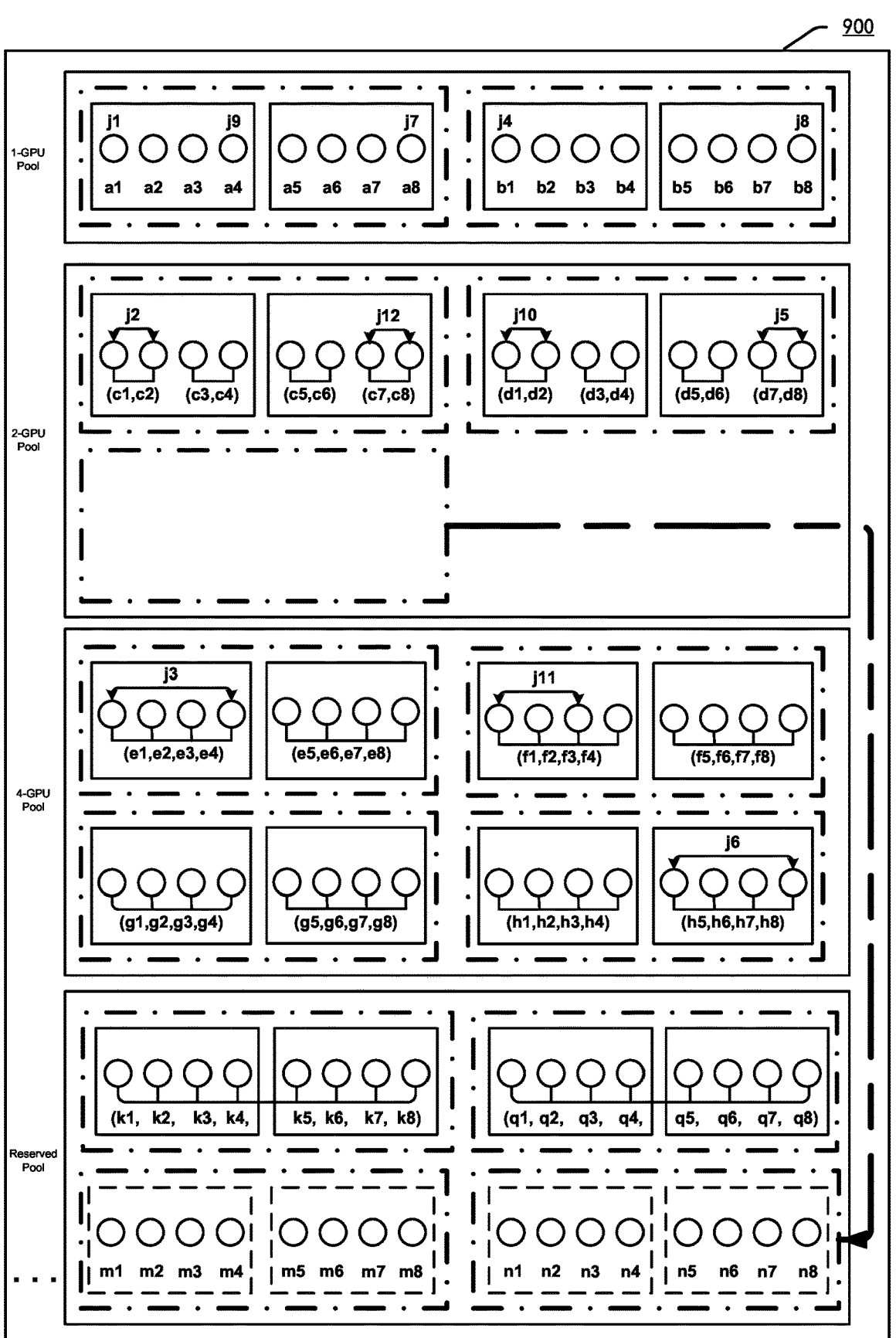
FIG. 9 illustrates a schematic diagram of exemplary GPU resource release involving GPU returning, based on the exemplary GPU resource assignment of FIG. 8, in accordance with an embodiment.

FIG. 9 illustrates a schematic diagram 900 of exemplary GPU resource release involving GPU return back, based on the exemplary GPU resource assignment of FIG. 8, in accordance with an embodiment.

As shown in operation 680 of FIG. 6, the GPU scheduled to perform the job is released back into the GPU pool after the job is completed. In the example of FIG. 9, the performing of the job j13 is finished. Since the GPUs n1, n2 for performing the job j13 are included in the node borrowed from the reserved pool, the entire node in which GPUs n1, n2 are located is returned back to the reserved pool after the GPUs n1, n2 are released, as indicated by the dashed arrow in FIG. 9. In other examples, after the job j13 is performed, only the GPU group including GPU n1, n2 may be returned back to the reserved pool, and other GPU groups may be remained in the 2-GPU pool for further use; optionally, only the GPUs n1, n2 may be returned back to the reserved pool, and other GPUs may be remained in the 2-GPU pool for further use, which is not shown in the figure. Additionally or optionally, the borrowed reserved GPUs or GPU groups or nodes may not be returned and be remained in the 2-GPU pool for further use, which is not shown in the figure.

FIG. 10 illustrates a flow diagram of another exemplary method 1000 for scheduling a plurality of GPUs, in accordance with an embodiment.

At 1010, multiple GPU pools may be set, wherein each pool is configured to serve one or more jobs requiring the same number of GPUs, and wherein the multiple GPU pools includes a reserved pool.

Figure 11:
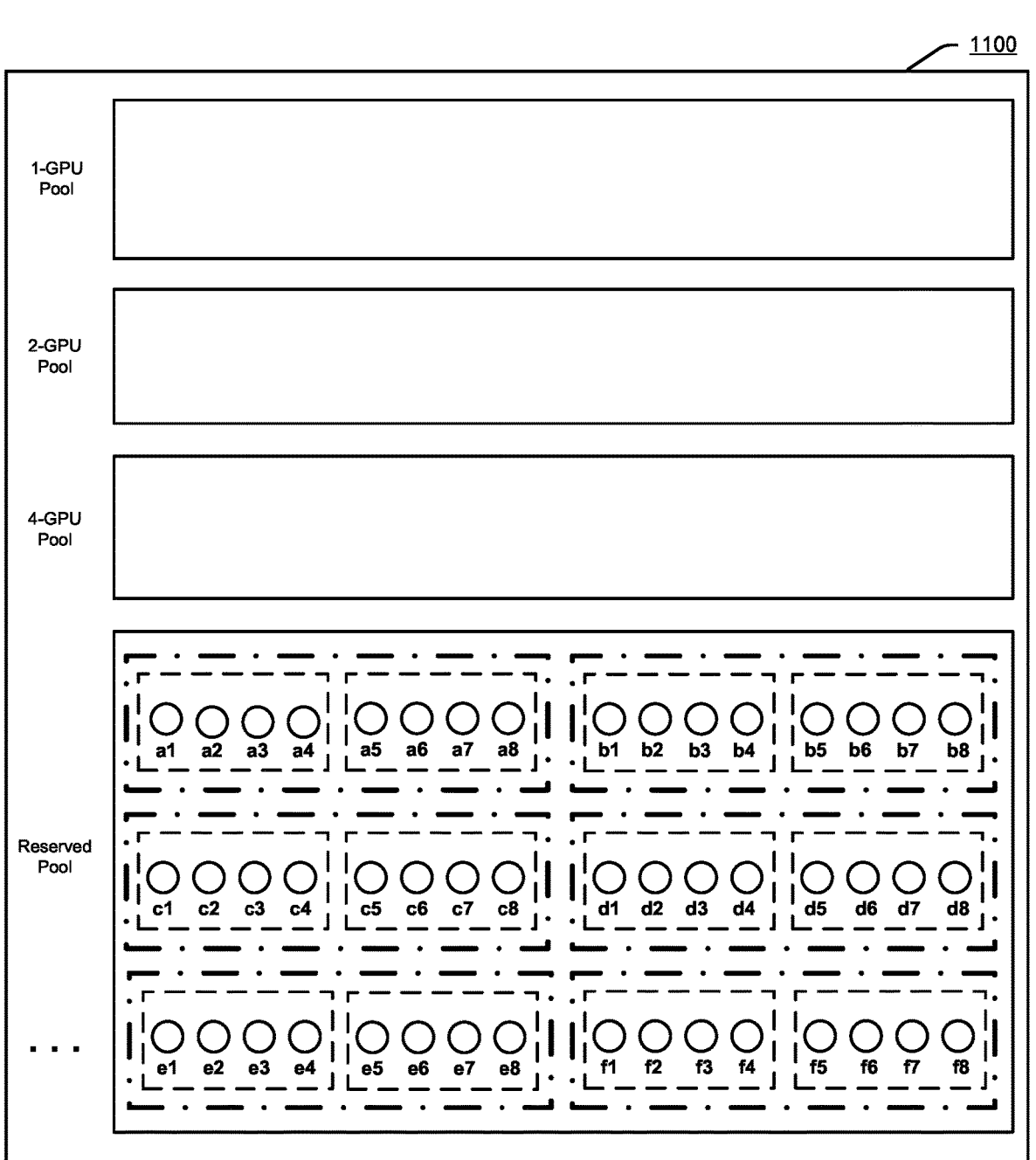
FIG. 11 illustrates a schematic diagram of an exemplary GPU resource assignment based on the exemplary method of FIG. 10, in accordance with an embodiment.

At 1020, all of the available GPUs are assigned to the reserved pool and zero GPU is assigned to each of the other pools of the multiple GPU pools initially, as the example shown in FIG. 11.

At 1030, a job and job information related to the job are received, wherein the job information indicates a number of GPUs required for performing the job. This operation is similar to 330 of FIG. 3.

At 1040, a corresponding GPU pool is selected based at least on the job information. This operation is similar to 340 of FIG. 3.

Figure 12:
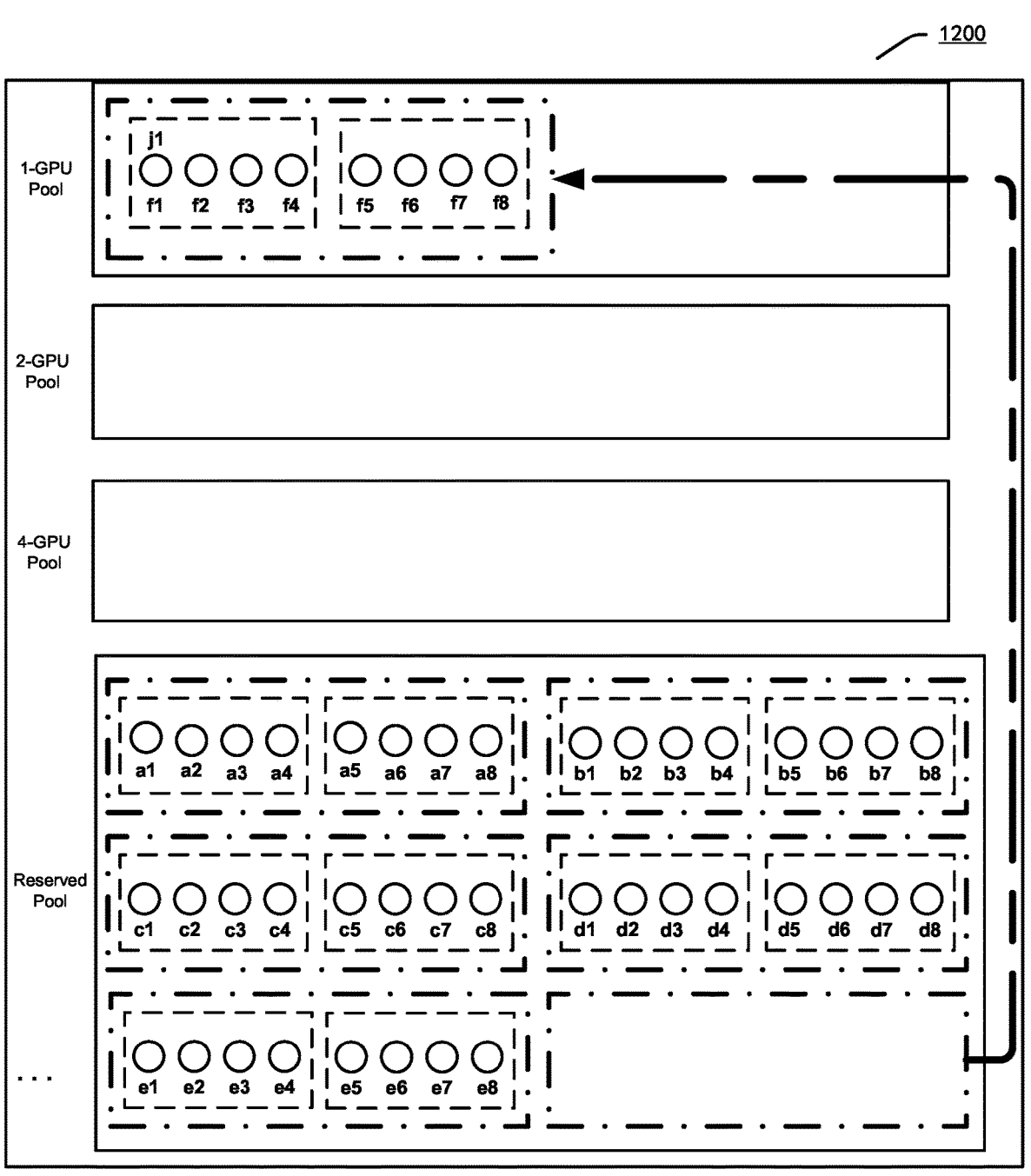
FIG. 12 illustrates a schematic diagram of an exemplary GPU resource assignment involving GPU borrowing based on the exemplary method of FIG. 10, in accordance with an embodiment.

At 1050, at least the required number of GPUs are borrowed from the reserved pool for being scheduled to perform the job, as the example shown in FIG. 12. For example, when the job information indicates that the received job is a 4-GPU job, at least 4 GPUs are borrowed from the reserved pool, for example, at least one GPU group including 4 GPUs, at least one node including 8 GPUs, etc.

At 1060, the required number of GPUs are scheduled from the borrowed GPUs to perform the job, as the example shown in FIG. 12. For example, when the job is a 4-GPU job and at least one node is borrowed from the reserved pool, 4 GPUs are determined from the borrowed nodes to perform the 4-GPU job.

Figure 13:
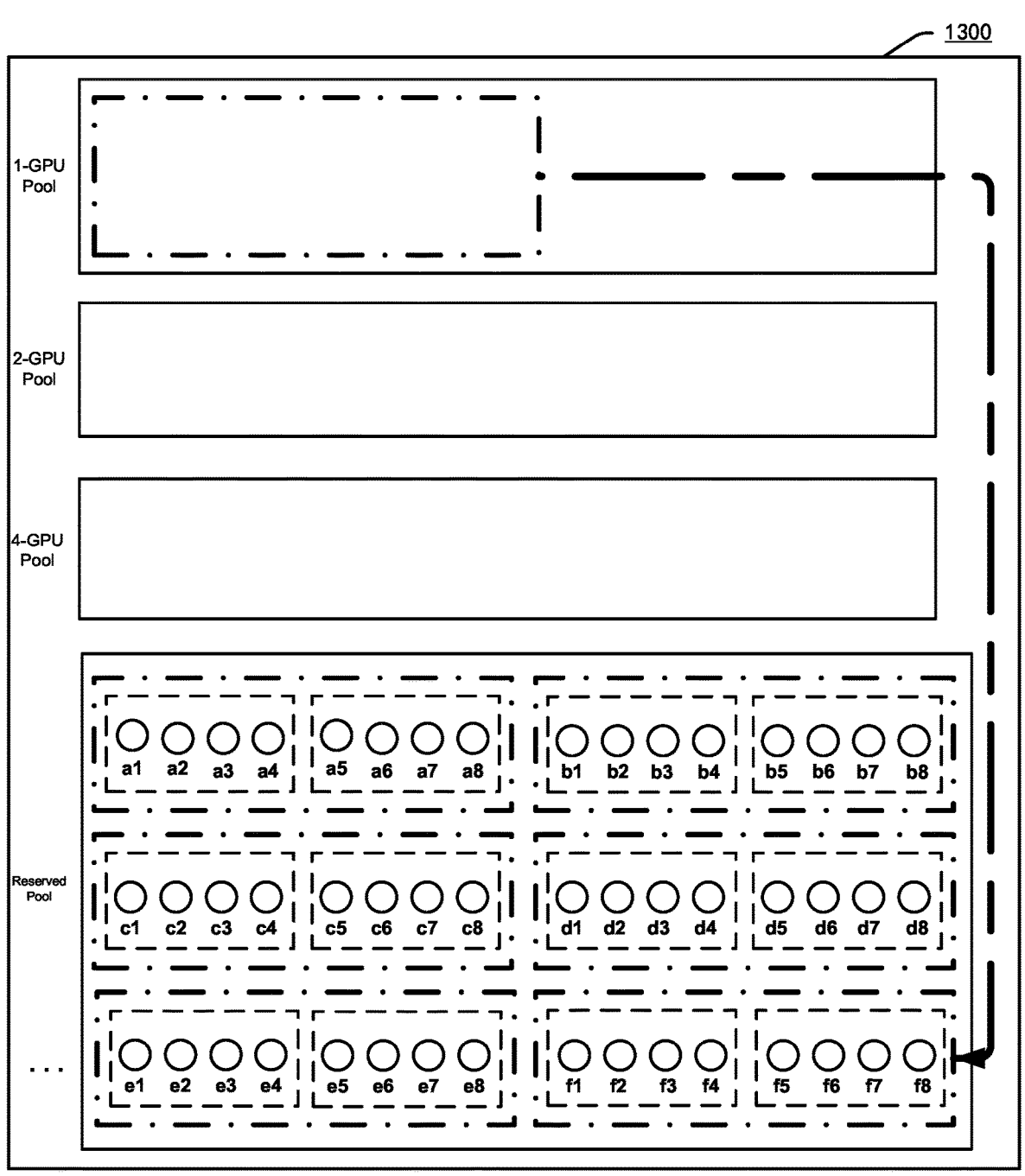
FIG. 13 illustrates a schematic diagram of an exemplary GPU resource release involving GPU returning, based on the exemplary GPU resource assignment of FIG. 12, in accordance with an embodiment.

At 1070, after the job is completed, the borrowed GPUs are returned back to the reserved pool, as the example shown in FIG. 13.

FIG. 11 illustrates a schematic diagram 1100 of an exemplary GPU resource assignment based on the exemplary method 1000 of FIG. 10, in accordance with an embodiment. In the example shown in FIG. 11, no GPU is assigned to the 1-GPU pool, the 2-GPU pool, and the 4-GPU pool, that is, zero GPU is assigned. All available GPUs a1-f8 are assigned to the reservation pool, where a dashed box comprising 4 circles represents one reserved GPU group comprising 4 GPUs that can be borrowed, a dotted line box including 2 dashed boxes represents one reserved node including 2 GPU groups that can be borrowed. That is, in the example shown in FIG. 11, 6 reserved nodes are assigned to the reserved pool, wherein each reserved node includes 2 reserved GPU groups, and each GPU group includes 4 reserved GPUs.

FIG. 12 illustrates a schematic diagram 1200 of an exemplary GPU resource assignment involving GPU borrowing based on the exemplary method of FIG. 10, in accordance with an embodiment.

In the example shown in FIG. 12, when the 1-GPU job j1 is received, the 1-GPU pool is selected according to the job information indicating that the job j1 requires 1 GPU. Since no GPU is assigned to the 1-GPU pool initially, at least 1 GPU is borrowed from the reserved pool to perform the job j1. In this example, borrowing is performed in a unit of node, for example, a node including GPUs f1-f8 are borrowed from the reserved pool, as indicated by the dashed arrows in FIG. 12. In other examples, borrowing may be performed in a unit of GPU group, for example, a GPU group including GPUs f1-f4 may be borrowed from the reserved pool. Additionally or optionally, borrowing may be performed in a unit of GPU, for example, GPU f1 and/or multiple GPUs may be borrowed from the reserved pool.

In the example shown in FIG. 12, one node including 8 GPUs is borrowed from the reserved pool. Since only one GPU is required to perform the 1-GPU job j1, it can be determined from the node including the GPUs f1-f8 that any one of the GPUs is scheduled to perform the job j1. For example, in the illustrated example, it is determined that the job j1 may be performed by using GPU f1. It should be understood that the required number of GPUs may be determined from the borrowed GPUs to perform jobs in any suitable manner.

FIG. 13 illustrates a schematic diagram of exemplary GPU resource release involving GPU returning back, based on the exemplary GPU resource assignment of FIG. 12, in accordance with an embodiment.

In the example shown in FIG. 13, when the job j1 is completed, the borrowed GPU is returned back to the reserved pool, as indicated by the dashed arrow in the figure. In this example, the borrowed GPU is returned back to the reservation pool in a unit of node including GPUs f1-f8. In other examples, the borrowed GPU may be returned back to the reservation pool in a unit of GPU group including GPUs f1-f4. Additionally or optionally, the borrowed GPU f1 may be returned back to the reserved pool in a unit of GPU, or any plurality of GPUs in the borrowed GPUs may be returned back to the reserved pool, for example, the GPUs f1, f2 are returned back to the reserved pool.

It should be understood that all of the GPU pools, nodes, GPU groups shown in the above figures are exemplary. In this application, each GPU pool may include any number of nodes, each node may include any number of GPU groups, and each GPU group may include any number of GPUs; and the number of nodes included in each GPU pool may be the same as or different from the number of nodes included in other GPU pools, the number of GPU groups included in each node may be the same as or different from the number of GPU groups included in other nodes, and the number of GPUs included in each GPU group may be the same as or different from the number of GPUs included in other GPU groups.

FIG. 14 illustrates a flow diagram of an exemplary method 1400 for scheduling a plurality of available GPUs, in accordance with an embodiment.

At 1410, multiple GPU pools may be set, wherein each pool is configured to serve one or more jobs requiring the same number of GPUs.

At 1420, available GPUs may be assigned to each GPU pool.

At 1430, a job and job information related to the job may be received, wherein the job information indicates a number of GPUs required for performing the job.

At 1440, a corresponding GPU pool may be selected based at least on the job information.

At 1450, available GPUs to be scheduled to the job in the selected GPU pool are determined based at least on the job information.

At 1460, the determined available GPUs are scheduled to the job.

In one implementation, multiple GPU pools include a reserved pool, and assigning available GPUs to each GPU pool further comprises: assigning at least one available GPU to the reserved pool as reserved GPUs, wherein the reserved GPUs are configured to be dedicated to serve jobs with high priority or configured to be shared by the reserved pool and other pools in the multiple GPU pools.

In addition, the method further includes: when the reserved GPUs are configured to be shared by the reserved pool and the other pools, at least one reserved GPU in the reserved GPUs is borrowed from the reserved pool when the other pools satisfy a predetermined condition; and after the at least one borrowed reserved GPU is released, returning the released reserved GPUs back to the reserved pool.

In a further implementation, the predetermined condition includes one or more condition of: a number of remaining GPUs in the other pools being less than a threshold; interference among jobs performed in the other pools being above a threshold; and waiting time of pending jobs in the other pools being above a threshold.

In an implementation, when the reserved GPUs are configured to be shared by the reserved pool and the other pools, assigning available GPUs to each GPU pool comprises: assigning all of the available GPUs to the reserved pool and assigning zero available GPU to each of the other GPU pools initially; and determining available GPUs to be scheduled to the job in the selected GPU pool further comprises: determining a number of the GPUs required for performing the job according to the job information, and borrowing at least the required number of GPUs from the reserved pool for scheduling to perform the job.

Additionally or alternatively, assigning available GPUs to each GPU pool comprises pre-assigning all of the available GPUs in a system to the multiple GPU pools.

In an implementation, assigning available GPUs to each GPU pool comprises assigning at least one GPU group to each GPU pool, wherein each GPU group includes at least one available GPU, and wherein the numbers of GPUs in each GPU group are the same or different.

In a further implementation, a number of GPU groups assigned to each GPU pool is adjustable.

In another implementation, determining available GPUs to be scheduled to the job in the selected GPU pool is performed at least by one of: in any manner of reducing interference among multiple jobs, in any manner of reducing communication cost between GPUs, and in any manner of reducing communication cost between central processing unit (CPU) and GPU.

In a further implementation, when the job information indicates that a number of GPUs required for performing the job is greater than one, determining available GPUs to be scheduled to the job in the selected GPU pool based at least on the job information further comprises: determining a corresponding number of available GPUs to be scheduled to the job; and selecting the corresponding number of available GPUs, wherein the corresponding number of available GPUs are closely adjacent in the GPU pool.

In a further implementation, selecting a corresponding GPU pool based at least on the job information further comprises: when it is determined that there is a corresponding GPU pool in the multiple GPU pools according to the number of GPUs required for performing the received job and indicated by the job information, selecting the corresponding GPU pool; and when it is determined that there is not a corresponding GPU pool in the multiple GPU pools according to the number of GPUs required for performing the received job and indicated by the job information, selecting one or more GPU pools from the multiple GPU pools, a number of GPUs used for serving a job in the selected one or more GPU pools being greater than the number of GPUs required for performing the received job.

It should be understood that the method 1400 may also include any of the steps/processing for scheduling a plurality of available graphics processing units (GPUs), in accordance with an embodiment of the present disclosure, as mentioned above.

Figure 15:
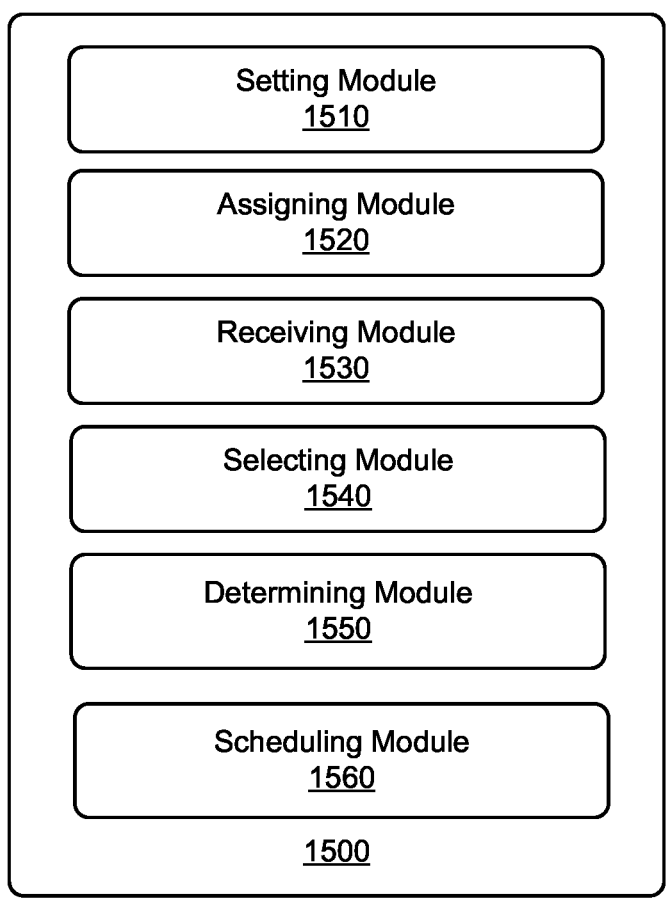
FIG. 15 illustrates an exemplary apparatus for scheduling a plurality of available GPUs, in accordance with an embodiment.

FIG. 15 illustrates an exemplary apparatus 1500 for scheduling a plurality of available GPUs, in accordance with an embodiment.

The apparatus 1500 may include: a setting module 1510, for setting multiple GPU pools, wherein each GPU pool is configured to serve one or more jobs requiring the same number of GPUs; an assigning module 1520, for assigning available GPUs to each GPU pool; a receiving module 1530, for receiving a job and job information related to the job, wherein the job information indicates a number of GPUs required for performing the job; a selecting module 1540, for selecting a corresponding GPU pool from the multiple GPU pools based at least on the job information; a determining module 1550, for determining available GPUs to be scheduled to the job in the selected GPU pool based at least on the job information; and a scheduling module 1560, for scheduling the determined available GPUs to the job.

In an implementation, the multiple GPU pools include a reserved pool, and the assigning module 1520 is further for assigning at least one available GPU to the reserved pool as reserved GPUs, wherein the reserved GPUs are configured to be dedicated to serve jobs with high priority and/or configured to be shared by the reserved pool and other pools in the multiple GPU pools.

In an implementation, when the reserved GPUs are configured to be shared by the reserved pool and the other pools, the assigning module 1520 is further for borrowing one or more reserved GPUs in the reserved GPUs from the reserved pool when the other pools satisfy a predetermined condition, and after the one or more borrowed reserved GPUs are released, returning the released reserved GPUs back to the reserved pool.

In an implementation, the predetermined condition includes one or more conditions of: a number of remaining GPUs in the other pools being less than a threshold; interference among jobs performed in the other pools being above a threshold; and waiting time of pending jobs in the other pools being above a threshold.

In a further implementation, when the reserved GPUs are configured to be shared by the reserved pool and the other pools, the assigning module 1520 is further for assigning all of the available GPUs to the reserved pool and assigning zero available GPU to each of the other pools initially; and the determining module 1550 is further for determining a number of the GPUs required for performing the job according to the job information, and the assigning module 1520 is further for borrowing at least the required number of GPUs from the reserved pool for scheduling to perform the job.

In a further implementation, the assigning module 1520 is further for assigning at least one GPU group to each GPU pool, wherein each GPU group includes at least one available GPU, and wherein the numbers of GPUs in each GPU group are the same or different.

Additionally or optionally, the assigning module 1520 is further for pre-assigning all of the available GPUs in a system to the multiple GPU pools.

In a further implementation, the selecting module 1540 is further for when it is determined that there is a corresponding GPU pool in the multiple GPU pools according to the number of GPUs required for performing the received job and indicated by the job information, selecting the corresponding GPU pool; and when it is determined that there is not a corresponding GPU pool in the multiple GPU pools according to the number of GPUs required for performing the received job and indicated by the job information, selecting one or more GPU pools from the multiple GPU pools, a number of GPUs used for serving a job in the selected one or more GPU pools being greater than the number of GPUs required for performing the received job.

It should be understood that the apparatus 1500 may also include any other module configured to schedule a plurality of available graphics processing units (GPUs) in accordance with an embodiment of the present disclosure, as mentioned above.

Figure 16:
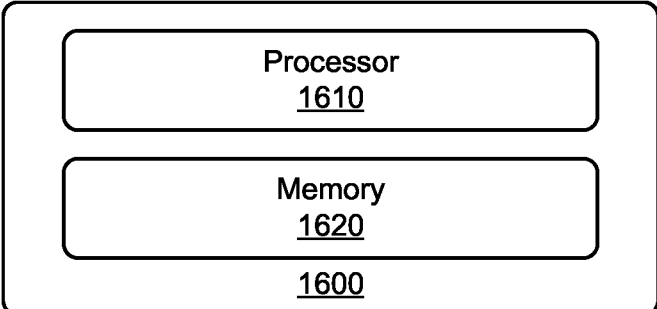
FIG. 16 illustrates another exemplary apparatus for scheduling a plurality of available GPUs, in accordance with an embodiment.

FIG. 16 illustrates another exemplary apparatus 1600 for scheduling a plurality of available GPUs, in accordance with an embodiment. The apparatus 1600 may include one or more processors 1610 and a memory 1620 that stores computer executable instructions that, when executed, may cause the one or more processors 1610 to perform the following operations: setting multiple GPU pools, wherein each GPU pool is configured to serve one or more jobs requiring the same number of GPUs; assigning available GPUs to each GPU pool; receiving a job and job information related to the job, wherein the job information indicates a number of GPUs required for performing the job; selecting a corresponding GPU pool from the multiple GPU pools based at least on the job information; determining available GPUs to be scheduled to the job in the selected GPU pool based at least on the job information; and scheduling the determined available GPUs to the job.

The embodiments of the present disclosure may be embodied in a non-transitory computer-readable medium. The non-transitory computer-readable medium may comprise instructions that, when executed, cause one or more processors to perform any operations of the methods for scheduling a plurality of available GPUs according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented as a microprocessor, a microcontroller, digital signal processor (DSP), a field programmable gate array (FPGA), a programmable logic device (PLD), a state machine, gate logic, discrete hardware circuits, and other suitable processing components configured to perform the various functions described throughout the present disclosure. The functions of a processor, any portion of a processor, or any combination of processors presented in the present disclosure may be implemented as software being executed by a microprocessor, microcontroller, DSP, or other suitable platform.

Software shall be construed broadly to mean instructions, instruction sets, code, code segments, program code, programs, subroutines, software modules, applications, software applications, software packages, routines, subroutines, objects, running threads, processes, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although the memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

The invention claimed is:

1. A computer-implemented method comprising:
setting a plurality of graphic processing units (GPU) pools, wherein at system start-up all available GPUs are assigned to a reserved pool and zero GPUs are initially assigned to each of the other GPU pools;
receiving job information related to a job, wherein the job information indicates a number of GPUs for the job;
selecting a GPU pool from the plurality of GPU pools based on the job information;
determining available GPUs in the selected GPU pool based on the job information, wherein two or more of the available GPUs are adjacent in the GPU pool;
when a job is pending in the selected GPU pool and a waiting time for the job exceeds a predetermined threshold, borrowing at least one GPU from the reserved pool to the selected GPU pool for scheduling to the job; and
scheduling the determined available GPUs in the selected GPU pool with the at least one GPU borrowed from the reserved pool to the job.

2. The computer-implemented method of claim 1, wherein each GPU pool is configured to serve one or more jobs requiring a same number of GPUs.

3. The computer-implemented method of claim 1, wherein the plurality of GPU pools includes the reserved pool, and
assigning the available GPUs to each GPU pool further comprises: assigning at least one available GPU to the reserved pool as reserved GPUs,
wherein the reserved GPUs are configured to be dedicated to serving jobs with high priority and/or configured to be shared by the reserved pool and other pools in the plurality of GPU pools.

4. The computer-implemented method of claim 3, further comprising:
when the reserved GPUs are configured to be shared by the reserved pool and the other pools, borrowing at least one reserved GPU in the reserved GPUs from the reserved pool when the other pools satisfy a predetermined condition; and
after the at least one borrowed reserved GPU is released, returning the released reserved GPU back to the reserved pool.

5. The computer-implemented method of claim 4, wherein the predetermined condition includes at least one condition of: a number of remaining GPUs in the other pools being less than a threshold, interference among jobs performed in the other pools being above the threshold, and waiting time of pending jobs in the other pools being above the threshold.

6. The computer-implemented method of claim 3, wherein,
when the reserved GPUs are configured to be shared by the reserved pool and the other pools, assigning the available GPUs to each GPU pool comprises: assigning all of the available GPUs to the reserved pool and assigning zero available GPU to each of the other pools initially; and
determining available GPUs to be scheduled to the job in the selected GPU pool further comprises: determining a number of the GPUs required for performing the job according to the job information, and borrowing at least the required number of GPUs from the reserved pool for scheduling to perform the job.

7. The computer-implemented method of claim 1, wherein assigning the available GPUs to each GPU pool comprises pre-assigning all of the available GPUs in a system to the plurality of GPU pools.

8. The computer-implemented method of claim 1, wherein assigning the available GPUs to each GPU pool comprises assigning at least one GPU group to each GPU pool, wherein each GPU group includes at least one available GPU, and wherein the numbers of GPUs in each GPU group are the same or different, wherein a number of GPU groups assigned to each GPU pool is adjustable, and wherein the assignment is dynamically re-balanced such that the difference in the total number of GPUs assigned to any two pools does not exceeds the number of GPUs in a single GPU group.

9. The computer-implemented method of claim 1, wherein determining the available GPUs to be scheduled to the job in the selected GPU pool is performed at least by one of: in any manner of reducing interference among multiple jobs, in any manner of reducing communication cost between GPUs, and in any manner of reducing communication cost between central processing unit (CPU) and GPU.

10. The computer-implemented method of claim 1, wherein when the job information indicates that a number of GPUs required for performing the job is greater than one, determining the available GPUs to be scheduled to the job in the selected GPU pool based at least on the job information further comprises:
determining a corresponding number of available GPUs to be scheduled to the job; and
selecting the corresponding number of available GPUs, wherein the corresponding number of available GPUs are adjacent in the GPU pool.

11. An apparatus for scheduling a plurality of available graphic processing units (GPUs), the apparatus comprising:
one or more processors; and a memory storing computer-executable instructions that, when executed, cause the one or more processors to perform operations comprising:

setting a plurality of graphic processing units (GPU) pools, wherein at system start-up all available GPUs are assigned to a reserved pool and zero GPUs are initially assigned to each of the other GPU pools;

receiving job information related to a job, wherein the job information indicates a number of GPUs for the job;

selecting a GPU pool from the plurality of GPU pools based on the job information;

determining available GPUs in the selected GPU pool based on the job information, wherein two or more of the available GPUs are adjacent in the GPU pool;

when a job is pending in the selected GPU pool and a waiting time for the job exceeds a predetermined threshold, borrowing at least one GPU from the reserved pool to the selected GPU pool for scheduling to the job; and scheduling the determined available GPUs in the selected GPU pool with the at least one GPU borrowed from the reserved pool to the job.

12. The apparatus of claim 11, wherein each GPU pool is configured to serve one or more jobs requiring a same number of GPUs.

13. The apparatus of claim 11, wherein the plurality of GPU pools includes the reserved pool, and assigning the available GPUs to each GPU pool further comprises: assigning at least one available GPU to the reserved pool as reserved GPUs, wherein the reserved GPUs are configured to be dedicated to serving jobs with high priority and/or configured to be shared by the reserved pool and other pools in the plurality of GPU pools.

14. The apparatus of claim 13, wherein the operations further comprise:

when the reserved GPUs are configured to be shared by the reserved pool and the other pools, borrowing at least one reserved GPU in the reserved GPUs from the reserved pool when the other pools satisfy a predetermined condition; and after the at least one borrowed reserved GPU is released, returning the released reserved GPU back to the reserved pool.

15. The apparatus of claim 14, wherein the predetermined condition includes at least one condition of: a number of remaining GPUs in the other pools being less than a threshold, interference among jobs performed in the other pools being above the threshold, and waiting time of pending jobs in the other pools being above the threshold.

16. The apparatus of claim 13, wherein the operations further comprise:

when the reserved GPUs are configured to be shared by the reserved pool and the other pools, assigning the available GPUs to each GPU pool comprises: assigning all of the available GPUs to the reserved pool and assigning zero available GPU to each of the other pools initially; and determining available GPUs to be scheduled to the job in the selected GPU pool further comprises: determining a number of the GPUs required for performing the job according to the job information, and borrowing at least the required number of GPUs from the reserved pool for scheduling to perform the job.

17. The apparatus of claim 11, wherein assigning the available GPUs to each GPU pool comprises pre-assigning all of the available GPUs in a system to the plurality of GPU pools.

18. The apparatus of claim 11, wherein assigning the available GPUs to each GPU pool comprises assigning at least one GPU group to each GPU pool, wherein each GPU group includes at least one available GPU, and wherein the numbers of GPUs in each GPU group are the same or different, wherein a number of GPU groups assigned to each GPU pool is adjustable, and wherein the assignment is dynamically re-balanced such that the difference in the total number of GPUs assigned to any two pools does not exceeds the number of GPUs in a single GPU group.

19. The apparatus of claim 11, wherein determining the available GPUs to be scheduled to the job in the selected GPU pool is performed at least by one of: in any manner of reducing interference among multiple jobs, in any manner of reducing communication cost between GPUs, and in any manner of reducing communication cost between central processing unit (CPU) and GPU.

20. A non-transitory computer-readable storage medium, the computer-readable storage medium including instructions that when executed by a computer, cause the computer to perform operations comprising:

setting a plurality of graphic processing units (GPU) pools, wherein at system start-up all available GPUs are assigned to a reserved pool and zero GPUs are initially assigned to each of the other GPU pools;

receiving job information related to a job, wherein the job information indicates a number of GPUs for the job;

selecting a GPU pool from the plurality of GPU pools based on the job information;

determining available GPUs in the selected GPU pool based on the job information, wherein two or more of the available GPUs are adjacent in the GPU pool;

when a job is pending in the selected GPU pool and a waiting time for the job exceeds a predetermined threshold, borrowing at least one GPU from the reserved pool to the selected GPU pool for scheduling to the job; and scheduling the determined available GPUs in the selected GPU pool with the at least one GPU borrowed from the reserved pool to the job.

* * * * *